United States Patent
Shangguan et al.

(10) Patent No.: US 12,528,712 B2
(45) Date of Patent: Jan. 20, 2026

(54) POSITIVE ELECTRODE MATERIALS OF LOW-COST ALKALINE SECONDARY BATTERIES AND PREPARATION METHODS AND APPLICATIONS THEREOF

(71) Applicants: HENAN CHAOLI NEW ENERGY CO., LTD., Henan (CN); CHAOWEI POWER GROUP CO., LTD., Zhejiang (CN)

(72) Inventors: Enbo Shangguan, Xinxiang (CN); Qingxia Liu, Xinxiang (CN); Huijie Li, Xinxiang (CN); Jing Li, Xinxiang (CN); Mingyu Wang, Xinxiang (CN); Liangsheng Li, Xinxiang (CN); Song Xu, Xinxiang (CN); Lirong Luo, Xinxiang (CN); Liangdong Zhao, Xinxiang (CN)

(73) Assignees: HENAN CHAOLI NEW ENERGY CO., LTD., Xinxiang (CN); CHAOWEI POWER GROUP CO., LTD., Huzhou (CN)

( * ) Notice: Subject to any disclaimer, the term of this patent is extended or adjusted under 35 U.S.C. 154(b) by 0 days.

(21) Appl. No.: 19/064,652

(22) Filed: Feb. 26, 2025

(65) Prior Publication Data
US 2025/0197240 A1 Jun. 19, 2025

Related U.S. Application Data

(63) Continuation-in-part of application No. PCT/CN2023/113763, filed on Aug. 18, 2023.

(30) Foreign Application Priority Data

Aug. 31, 2022 (CN) .......................... 202211049383.2

(51) Int. Cl.
C01G 45/024 (2025.01)
C01G 53/84 (2025.01)
H01M 10/26 (2006.01)

(52) U.S. Cl.
CPC ........... *C01G 45/024* (2025.01); *C01G 53/84* (2025.01); *H01M 10/26* (2013.01);
(Continued)

(58) Field of Classification Search
CPC ..... C01G 45/024; C01G 53/84; H01M 10/26; H01M 4/362; H01M 4/24; H01M 4/366;
(Continued)

(56) References Cited

U.S. PATENT DOCUMENTS 5,156,934 A   10/1992   Kainthia et al.

FOREIGN PATENT DOCUMENTS

| CN | 1627551 A | * | 6/2005 |
| CN | 1697213 A |   | 11/2005 |

(Continued)

OTHER PUBLICATIONS

International Search Report in PCT/CN2023/113763 mailed on Nov. 17, 2023, 10 pages.

(Continued)

*Primary Examiner* — Daniel S Gatewood
(74) *Attorney, Agent, or Firm* — JEEN IP LAW, LLC

(57) ABSTRACT

Embodiments of the present disclosure disclose a low-cost alkaline secondary battery positive electrode material and a preparation method and application thereof, which belongs to the technical field of alkaline secondary battery. The positive electrode material includes a composite positive electrode material including manganese dioxide and partially oxidized layered hydroxide, etc. The composite positive electrode material prepared by the embodiments of the present disclosure has the advantage of a high discharge (Continued)

platform, or the like, with respect to a conventional manganese electrode, which significantly improves the cycling stability and reversibility of the zinc-manganese alkaline secondary battery.

14 Claims, 7 Drawing Sheets

(52) U.S. Cl.
CPC ...... *C01P 2002/72* (2013.01); *C01P 2004/03* (2013.01); *C01P 2004/84* (2013.01); *C01P 2006/40* (2013.01)

(58) Field of Classification Search
CPC ............ H01M 4/48; H01M 4/50; H01M 4/52; H01M 4/62; H01M 4/624; H01M 10/24; C01P 2002/72; C01P 2004/03; C01P 2004/84; C01P 2006/40; Y02E 60/10
See application file for complete search history.

(56) References Cited

FOREIGN PATENT DOCUMENTS

| | | | | | |
|---|---|---|---|---|---|
| CN | 1948159 | A | * | 4/2007 | ............. B82Y 30/00 |
| CN | 101156266 | A | | 4/2008 | |
| CN | 101677135 | A | | 3/2010 | |
| CN | 104037406 | A | * | 9/2014 | ............. H01M 4/28 |
| CN | 104701521 | A | | 6/2015 | |
| CN | 105406056 | A | | 3/2016 | |
| CN | 106848315 | A | | 6/2017 | |
| CN | 107681132 | A | | 2/2018 | |
| CN | 111498914 | A | * | 8/2020 | ............. C01G 53/82 |
| CN | 115312732 | A | | 11/2022 | |
| IN | 202017005086 | A | | 3/2020 | |
| JP | 2006054159 | A | | 2/2006 | |
| JP | 2017004868 | A | | 1/2017 | |

OTHER PUBLICATIONS

Written Opinion in PCT/CN2023/113763 mailed on Nov. 17, 2023, 8 pages.
Chang, Zhaorong et al., Study on regulation of the discharge storage capacity of anode in Ni/MH battery by Niooh, Battery Bimonthly, 37(5): 367-369, 2007.
Feng, Yanyan et al., Preparation and electrochemical property of Ni—Co layered double hydroxides/acetylene black composites, 37(11): 4378-4383, 2018.
Zhang, W.H. et al., Preparation of Ni(II)/Ti(IV) layered double hydroxide at high supersaturation, Journal of the European Ceramic Society, 28: 1623-1629, 2008.

* cited by examiner

POSITIVE ELECTRODE MATERIALS OF LOW-COST ALKALINE SECONDARY BATTERIES AND PREPARATION METHODS AND APPLICATIONS THEREOF

CROSS-REFERENCE TO RELATED APPLICATIONS

This application is a Continuation-in-part of International Application No. PCT/CN2023/113763, filed on Aug. 18, 2023, which claims priority to Chinese Patent Application No. 202211049383.2, filed on Aug. 31, 2022, the entire contents of each of which are hereby incorporated by reference.

TECHNICAL FIELD

The present disclosure relates to the technical field of positive electrode materials for alkaline secondary batteries, and in particular, to a low-cost positive electrode material of an alkaline secondary battery and preparation methods and applications thereof.

BACKGROUND

Zinc-manganese alkaline secondary batteries have the advantages of low cost, non-toxicity and environmentally friendly, and good safety compared with other batteries, etc., and have a broad application prospect in the field of energy storage and civil market. $MnO_2$ is a metal oxide, that belongs to a semiconductor material, and it is a commonly used positive electrode material for primary dry batteries. In zinc-manganese alkaline secondary batteries, the positive electrode of $MnO_2$ suffers from low electrical conductivity (conductivity of $10^{-5}$ to $10^{-6}$ S·cm$^{-1}$) and poor structural stability, which seriously restricts the wide application of zinc-manganese alkaline secondary batteries. The volume of $MnO_2$ is greatly expanded and contracted during the charging and discharging process and is easy to generate electrochemically inert low-valent manganese oxides (e.g., $Mn_3O_4$, etc.), resulting in the destruction of the structure of the positive electrode material and the reduction of the quality of the active material, which affects the electrochemical performance of the battery. As a result, the capacity performance, multiplication performance, and cycling stability performance of zinc-manganese alkaline secondary batteries are still difficult to meet the demands of practical applications.

A zinc-manganese alkaline secondary battery is mainly composed of the positive electrode, diaphragm, electrolyte, negative electrode, etc. The research on the positive electrode focuses on the development of new positive electrode materials and modification of manganese dioxide materials. Modified $MnO_2$ is obtained by physical doping, chemical doping, and electrochemical deposition doping, which has a large improvement in chargeability. In addition, the reversibility of various crystalline types of $MnO_2$ is also improved after modification. However, rechargeable zinc-manganese alkaline secondary batteries are still limited by their poor cycling stability in practical applications. Therefore, the development of new positive electrode materials is still the key to the technological progress of zinc-manganese alkaline secondary batteries.

SUMMARY

In order to overcome the deficiencies of the current $MnO_2$ positive electrode material for zinc-manganese alkaline secondary batteries, embodiments of the present disclosure provide a positive electrode material for a low-cost alkaline secondary battery and a preparation method thereof. The method produces a positive electrode material with a higher discharge capacity, higher discharge platform and better cycle stability performance, and may be used to prepare positive electrodes for zinc-manganese secondary batteries.

In order to solve the above technical problems, embodiments of the present disclosure provide a positive electrode material for a low-cost alkaline secondary battery. The positive electrode material may be a composite positive electrode material including manganese dioxide and layered hydroxide $[Ni_xM_yA_z(OH)_2]\cdot[(B^{a-})_b\cdot mH_2O]$, a composite positive electrode material including the manganese dioxide and partially oxidized layered hydroxide $[Ni_xM_yA_z(OH)_2]\cdot[(B^{a-})_b\cdot mH_2O]$, a composite positive electrode material including the manganese dioxide and layered hydroxyl oxide $[Ni_xM_yA_zOOH]$, or a composite positive electrode material including the manganese dioxide, a conductive material, and one of the layered hydroxide $[Ni_xM_yA_z(OH)_2]\cdot[(B^{a-})_b\cdot mH_2O]$, the partially oxidized layered hydroxide $[Ni_xM_yA_z(OH)_2]\cdot[(B^{a-})_b\cdot mH_2O]$, and the layered hydroxyl oxide $[Ni_xM_yA_zOOH]$, the composite positive electrode material having a three-dimensional structure. M may be Bi or Ti, A may be one or two of Ce, Al, Zn, Ca, Mg, Co, Y, Ga, Sb, Yb, and Cu, and $B^{a-}$ may be one or more of $OH^-$, $Cl^-$, $F^-$, $PO_4^{3-}$, $SO_4^{2-}$, $CO_3^{2-}$, $NO_3^-$, $BO_2^-$, $MoO_4^{2-}$, $WO_4^{2-}$, $0.9 \geq x \geq 0.5$, $0.3 \geq y \geq 0.1$, $0.2 \geq z \geq 0.01$, $x+y+z=1$, $b>0$, and $m>0$.

Embodiments of the present disclosure provide a positive electrode plate for an alkaline secondary battery. The positive electrode plate for the alkaline secondary battery may be made from the aforementioned positive electrode material for the low-cost alkaline secondary.

Embodiments of the present disclosure provide an alkaline secondary battery including a battery casing, an electrode group sealed in the battery casing, and an electrolyte. The electrode plate set may include a positive electrode plate, a negative electrode plate, and a diaphragm. The positive electrode plate may be the positive electrode plate for the alkaline secondary battery, the electrolyte may be an alkaline solution of potassium hydroxide, and the electrolyte was added with sodium hexafluoroantimonate with a mass fraction within a range of 0.1%-2%.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

Figure 1:
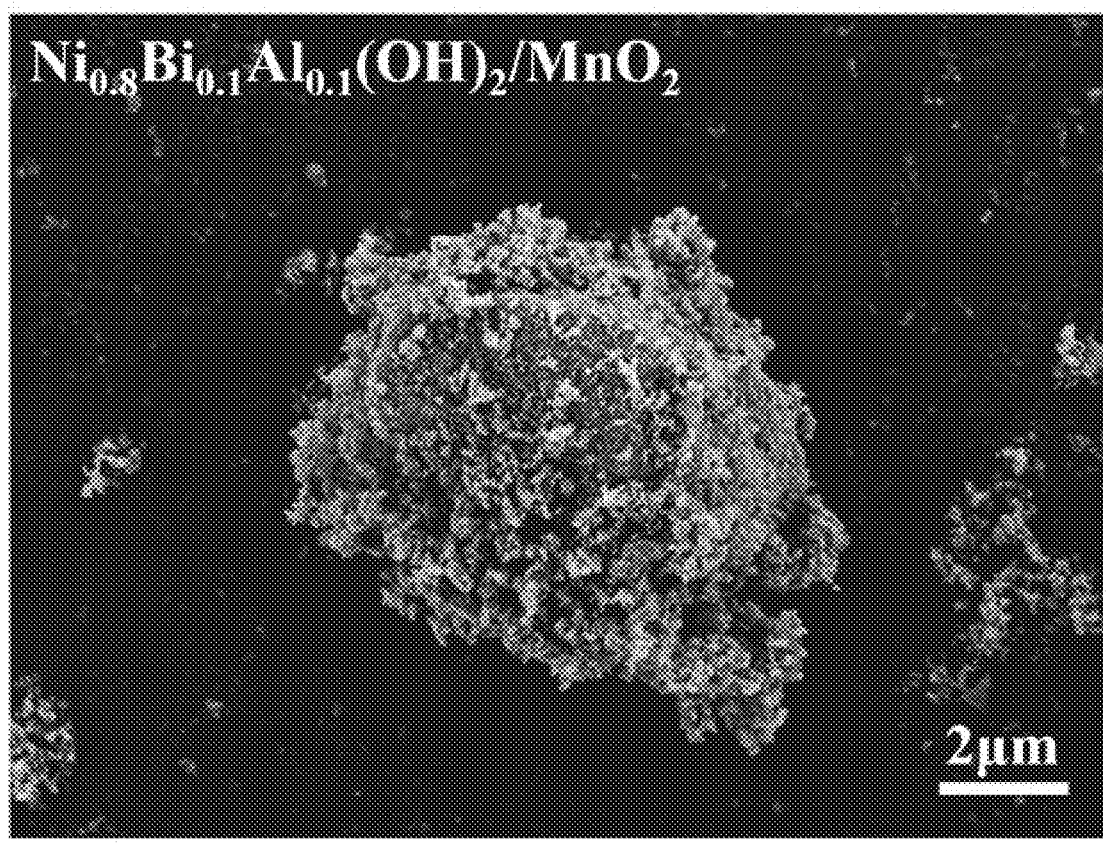
FIG. 1 is a scanning electron micrograph of a composite positive electrode material prepared in embodiment 1.

To more clearly illustrate the technical solutions related to the embodiments of the present disclosure, a brief introduction of the drawings referred to the description of the embodiments is provided below. The accompanying drawings do not represent the entirety of the embodiments.

It should be understood that "system", "device", "unit" and/or "module" as used herein is a manner used to distinguish different components, elements, parts, sections, or assemblies at different levels. However, if other words serve the same purpose, the words may be replaced by other expressions.

When describing the operations performed in the embodiments of the present disclosure in step-by-step instructions, the order of the steps are all interchangeable if not otherwise indicated, the steps may be omitted, and other steps may be included in the process of operation.

In some embodiments, a positive electrode material of a low cost alkaline secondary battery includes a composite positive electrode material including manganese dioxide and layered hydroxide $[Ni_xM_yA_z(OH)_2]\cdot[(B^{a-})_b\cdot mH_2O]$, a composite positive electrode material including the manganese dioxide and partially oxidized layered hydroxide $[Ni_xM_yA_z(OH)_2]\cdot[(B^{a-})_b\cdot mH_2O]$, a composite positive electrode material including the manganese dioxide and layered hydroxyl oxide $[Ni_xM_yA_zOOH]$, or a composite positive electrode material including the manganese dioxide, a conductive material, and one of the layered hydroxide $[Ni_xM_yA_z(OH)_2]\cdot[(B^{a-})_b\cdot mH_2O]$, the partially oxidized layered hydroxide $[Ni_xM_yA_z(OH)_2]\cdot[(B^{a-})_b\cdot mH_2O]$, and the layered hydroxyl oxide $[Ni_xM_yA_zOOH]$. The composite positive electrode material has a three-dimensional structure. M in the composite positive electrode material includes Bi or Ti, etc. A includes one or two of Ce, Al, Zn, Ca, Mg, Co, Y, Ga, Sb, Yb, Cu, etc., $B^{a-}$ is $OH^-$, $Cl^-$, $F^-$, $PO_4^{3-}$, $SO_4^{2-}$, $CO_3^{2-}$, $NO_3^-$, $BO_2^-$, $MoO_4^{2-}$, $WO_4^{2}$, etc., or a combination thereof, and $0.9 \geq x \geq 0.5$, $0.3 \geq y \geq 0.1$, $0.2 \geq z \geq 0.01$, $x+y+z=1$, $b>0$, $m>0$.

The low-cost alkaline secondary battery refers to an alkaline secondary battery that has a cost value lower than a cost threshold. The cost threshold is pre-set based on historical experience.

The cost value is used to measure the cost of the alkaline secondary battery. In some embodiments, the cost value correlates to the preparation material and the preparation process. The more diverse the source of the preparation material and the more simplified the preparation process, the lower the cost value.

In some embodiments, the three-dimensional structure includes a multi-stage pore structure, a cladding structure, or the like, a hybrid structure thereof, or a customized three-dimensional structure.

In some embodiments, the values of x, y, z, b, and m in the above embodiments may be adjusted or set accordingly based on actual preparation needs.

In some embodiments of the present disclosure, Bi or Ti fills tunnels and interlayers during the charging and discharging process of the $MnO_2$, so that the protons and electrons flow freely between lattices, inhibiting the lattices to be expanded and stabilizing the lattices and the active sites.

In some embodiments, a mass percentage of the layered hydroxide $[Ni_xM_yA_z(OH)_2]\cdot[(B^{a-})_b\cdot mH_2O]$, or the partially oxidized layered hydroxide $[Ni_xM_yA_z(OH)_2]\cdot[(B^{a-})_b\cdot mH_2O]$, or the layered hydroxyl oxide $[Ni_xM_yA_zOOH]$ in the composite positive electrode material is within a range of 5%-75%.

In some embodiments, the mass percentage of the layered hydroxide $[Ni_xM_yA_z(OH)_2]\cdot[(B^{a-})_b\cdot mH_2O]$, or the partially oxidized layered hydroxide $[Ni_xM_yA_z(OH)_2]\cdot[(B^{a-})_b\cdot mH_2O]$, or the layered hydroxyl oxide $[Ni_xM_yA_zOOH]$ in the composite positive electrode material is within a range of 15%-65%. As another example, the mass percentage of the layered hydroxide $[Ni_xM_yA_z(OH)_2]\cdot[(B^{a-})_b\cdot mH_2O]$, or the partially oxidized layered hydroxide $[Ni_xM_yA_z(OH)_2]\cdot[(B^{a-})_b\cdot mH_2O]$, or the layered hydroxyl oxide $[Ni_xM_yA_zOOH]$ in the composite positive electrode material is within a range of 25%-55%. As yet another example, the mass percentage of the layered hydroxide $[Ni_xM_yA_z(OH)_2]\cdot[(B^{a-})_b\cdot mH_2O]$, or the partially oxidized layered hydroxide $[Ni_xM_yA_z(OH)_2]\cdot[(B^{a-})_b\cdot mH_2O]$, or the layered hydroxyl oxide $[Ni_xM_yA_zOOH]$ in the composite positive electrode material is within a range of 35%-45%.

In some embodiments, the mass percentage of the layered hydroxide $[Ni_xM_yA_z(OH)_2]\cdot[(B^{a-})_b\cdot mH_2O]$, or the partially oxidized layered hydroxide $[Ni_xM_yA_z(OH)_2]\cdot[(B^{a-})_6\cdot mH_2O]$, or the layered hydroxyl oxide $[Ni_xM_yA_zOOH]$ in the composite positive electrode material in the above embodiments may be adjusted or set accordingly based on the actual preparation needs. For example, the mass percentage of the layered hydroxide $[Ni_xM_yA_z(OH)_2]\cdot[(B^{a-})_b\cdot mH_2O]$, or the partially oxidized layered hydroxide $[Ni_xM_yA_z(OH)_2]\cdot[(B^{a-})_b\cdot mH_2O]$, or the layered hydroxyl oxide $[Ni_xM_yA_zOOH]$ in the composite positive electrode material is within a range of 3%-80%, etc.

In some embodiments, the conductive material includes one or two of graphene, carbon nanotube, acetylene black, flake graphite, hydroxyl cobalt oxide, nitrogen carbide, titanium carbide, niobium carbide, titanium nitride, etc. A mass percentage of the conductive material in the composite positive electrode material is within a range of 0.5%-20%. The manganese dioxide includes $\alpha$-$MnO_2$, $\beta$-$MnO_2$, $\gamma$-$MnO_2$, $\delta$-$MnO_2$, $\varepsilon$-$MnO_2$, etc., or a combination thereof.

In some embodiments, the mass percentage of the conductive material in the composite positive electrode material is within a range of 4.5%-16%. As another example, the mass percentage of the conductive material in the composite positive electrode material is within a range of 6.5%-14%. As yet another example, the mass percentage of the conductive material in the composite positive electrode material is within a range of 8.5%-12%.

In some embodiments, the mass percentage of the conductive material in the composite positive electrode material may be adjusted or set accordingly based on actual preparation needs. For example, the mass percentage of the conductive material in the composite positive electrode material is within a range of 0.5%-25%, or the like.

In some embodiments, the composite positive electrode material including manganese dioxide and the layered hydroxide $[Ni_xM_yA_z(OH)_2]\cdot[(B^{a-})_b\cdot mH_2O]$ is prepared as follows.

In S1, a ball-milling operation and a sieving operation is performed on a manganese dioxide precursor to obtain a processed manganese dioxide precursor.

In some embodiments, the processing of the manganese dioxide precursor may also include a plurality of manners, such as ultrasonic grinding.

In S2, a compound salt solution is prepared by dissolving a soluble nickel salt, one of a soluble bismuth salt and a soluble titanium salt, and an A-metal salt in deionized water, an alkaline solution is prepared by dissolving an alkaline hydroxide in deionized water, the alkaline solution is added to the compound salt solution at a temperature within a range of 15-50° C. to form a mixed liquid, and the mixed liquid is continuously stirred to react and form a suspension liquid with PH within a range of 7-11 after the reaction is completed.

In some embodiments, in addition to the range of 15-50° C. as described above, the temperature required for the reaction of the alkaline solution with the compound salt solution may be adjusted or set accordingly based on the actual preparation needs.

In some embodiments, in addition to 7-11 as described above, the pH of the suspension liquid required to be achieved after completion of the reaction may be adjusted or set accordingly based on the actual preparation needs.

The suspension liquid is reacted at a temperature within a range 50-95° C. for 5 to 48 hours, cooled to room temperature, and then filtered, washed and dried to obtain a powder. The powder is transferred to a solution prepared from one or more of alkaline hydroxide, phosphate, tungstate, molybdate, chlorinated salt, fluorinated salt, carbonate, metaborate, or borate. The solution with the powder is processed under an inert atmosphere or in air at a temperature within a range of 25-200° C. for 1 to 24 hours. The layered hydroxide $[Ni_xM_yA_z(OH)_2] \cdot [(B^{a-})_b \cdot mH_2O]$ is obtained by filtering, washing, and drying the processed solution with the powder.

The inert atmosphere includes nitrogen or helium, etc. The room temperature is preset (e.g., 25° C., etc.).

In some embodiments, in addition to 50-95° C. and 5 to 48 hours as described above, the temperature range and reaction time required for the suspension liquid to undergo the reaction may be adjusted or set accordingly based on the actual preparation needs.

In some embodiments, in addition to 25-200° C. and 1 to 24 hours as described above, the temperature and reaction time required for the reaction of the powder with the solution formulated from the alkaline hydroxide, or the like, may be adjusted or set accordingly based on the actual preparation needs.

In S3, the processed manganese dioxide precursor obtained in S1 and the layered hydroxide $[Ni_xM_yA_z(OH)_2] \cdot [(B^{a-})_b \cdot mH_2O]$ obtained in S2 are mixed to obtain a mixture and then the mixture is subjected to a high-energy ball-milling operation to obtain the composite positive electrode material.

In some embodiments, the processing of the above mixture may also include a plurality of manners, such as ultrasonic grinding, or the like.

In some embodiments, the preparation materials used in each step of the above preparation process, the manner of reaction or processing, as well as the temperature and time of the reaction or processing, etc., may be adjusted or set accordingly based on the actual preparation needs.

In some embodiments, the composite positive electrode material including the manganese dioxide and the partially oxidized layered hydroxide $[Ni_xM_yA_z(OH)_2] \cdot [(B^{a-})_b \cdot mH_2O]$ and the composite positive electrode material including the manganese dioxide and the layered hydroxyl oxide $[Ni_xM_yA_zOOH]$ are prepared as follows.

In S1, a ball-milling operation and a sieving operation is performed on a manganese dioxide precursor to obtain a processed manganese dioxide precursor.

In some embodiments, the processing of the manganese dioxide precursor may also include a plurality of manners, such as ultrasonic grinding.

In S2, a compound salt solution is prepared by dissolving a soluble nickel salt, one of a soluble bismuth salt and a soluble titanium salt, and an A-metal salt in deionized water, an alkaline solution is prepared by dissolving an alkaline hydroxide in deionized water, the alkaline solution is added to the compound salt solution at a temperature within a range of 15-50° C. to form a mixed liquid, and the mixed liquid is continuously stirred to react and form a suspension liquid with PH within a range of 7-11 after the reaction is completed.

The suspension liquid is reacted at a temperature within a range 50-95° C. for 5 to 48 hours, cooled to room temperature, and then filtered, washed and dried to obtain a powder. The powder is transferred to a solution prepared from one or more of alkaline hydroxide, phosphate, tungstate, molybdate, chlorinated salt, fluorinated salt, carbonate, metaborate, or borate. The solution with the powder is processed under an inert atmosphere or in air at a temperature within a range of 25-200° C. for 1 to 24 hours. The layered hydroxide $[Ni_xM_yA_z(OH)_2] \cdot [(B^{a-})_b \cdot mH_2O]$ is obtained by filtering, washing, and drying the processed solution with the powder. The partially oxidized layered hydroxide $[Ni_xM_yA_z(OH)_2] \cdot [(B^{a-})_b \cdot mH_2O]$ or a fully oxidized layered hydroxyl oxide $[Ni_xM_yA_zOOH]$ is obtained by oxidizing the layered hydroxide by chemical oxidation or electrolytic oxidation.

In S3, the processed manganese dioxide precursor obtained in S1 is mixed with the partially oxidized layered hydroxide $[Ni_xM_yA_z(OH)_2] \cdot [(B^{a-})_b \cdot mH_2O]$ or the fully oxidized layered hydroxyl oxide $[Ni_xM_yA_zOOH]$ obtained in S2 to obtain a mixture, and the composite positive electrode material is obtained by performing a high-energy ball-milling operation on the mixture.

In some embodiments, the processing of the above mixture may also include a plurality of manners, such as ultrasonic grinding, or the like.

In some embodiments, the preparation materials used in each step of the above preparation process, the manner of reaction or processing, as well as the temperature and time of the reaction or processing, etc., may be adjusted or set accordingly based on the actual preparation needs.

In some embodiments, the composite positive electrode material including the manganese dioxide, the conductive material, and the layered hydroxide $[Ni_xM_yA_z(OH)_2] \cdot [(B^{a-})_b \cdot mH_2O]$, the partially oxidized layered hydroxide $[Ni_xM_yA_z(OH)_2] \cdot [(B^{a-})_b \cdot mH_2O]$, or the layered hydroxyl oxide [NixMyAZOOH] is prepared as follows.

In S1, a ball-milling process is performed on a manganese dioxide precursor, and a processed manganese dioxide precursor is obtained by sieving.

In some embodiments, the treatment of the manganese dioxide precursor may also include a plurality of manners, such as ultrasonic grinding.

In S2, a compound salt solution is prepared by dissolving a soluble nickel salt, one of a soluble bismuth salt and a soluble titanium salt, and an A-metal salt in deionized water, an alkaline solution is prepared by dissolving an alkaline hydroxide in deionized water, the alkaline solution is added to the compound salt solution at a temperature within a range of 15-50° C., and the solution is continuously stirred until pH of a suspension liquid is within a range of 7-11 after the reaction is completed.

The suspension liquid is reacted at a temperature within a range 50-95° C. for 5 to 48 hours, cooled to room temperature, and then filtered, washed and dried to obtain a powder. The powder is transferred to a solution prepared from one or more of alkaline hydroxide, phosphate, tungstate, molybdate, chlorinated salt, fluorinated salt, carbonate, metaborate, or borate. The solution with the powder is processed under an inert atmosphere or in air at a temperature within a range of 25-200° C. for 1 to 24 hours. The layered hydroxide $[Ni_xM_yA_z(OH)_2]\cdot[(B^{a-})_b\cdot mH_2O]$ is obtained by filtering, washing, and drying the processed solution with the powder. The partially oxidized layered hydroxide $[Ni_xM_yA_z(OH)_2]\cdot[(B^{a-})_b\cdot mH_2O]$ or a fully oxidized layered hydroxyl oxide $[Ni_xM_yA_zOOH]$ is obtained by oxidizing the layered hydroxide by chemical oxidation or electrolytic oxidation.

In S3, the processed manganese dioxide precursor obtained in S1, the conductive material and the layered hydroxide $[Ni_xM_yA_z(OH)_2]\cdot[(B^{a-})_b\cdot mH_2O]$, the partially oxidized layered hydroxide $[Ni_xM_yA_z(OH)_2]\cdot[(B^{a-})_b\cdot mH_2O]$, or the fully oxidized layered hydroxide $[Ni_xM_yA_zOOH]$ obtained in S2 are homogeneously dispersed into water or an organic solvent. The reaction is carried out at a temperature within a range of 15-90° C. in an atmospheric pressure vessel to obtain a product, and then the composite positive electrode material is obtained by drying the product.

The atmospheric pressure vessel refers to a container with a pressure within a preset pressure range. The preset pressure range is pre-set based on historical experience.

In some embodiments, in addition to 15-90° C. as described above, the temperature required for the water or organic solvent for the reaction in the atmospheric pressure vessel described above may be adjusted or set accordingly based on the actual preparation needs.

In some embodiments, the preparation materials used in each step of the above preparation process, the manner of reaction or processing, as well as the temperature and time of the reaction or processing, etc., may be adjusted or set accordingly based on the actual preparation needs.

In some embodiments, the soluble nickel salt is one or more of nickel nitrate, nickel sulfate, nickel acetate, or nickel chloride. The soluble bismuth salt is bismuth nitrate. The soluble titanium salt is titanium sulfate. The A-metal salt is one or more of cerium nitrate, cerium chloride, aluminum nitrate, aluminum chloride, aluminum sulfate, zinc nitrate, zinc sulfate, zinc chloride, calcium acetate, calcium chloride, magnesium acetate, magnesium chloride, cobalt nitrate, cobalt chloride, cobalt sulfate, yttrium nitrate, yttrium sulfate, yttrium chloride, gallium nitrate, antimony sulfate, antimony chloride, ytterbium nitrate, ytterbium chloride, copper chloride, copper sulfate, copper nitrate; the phosphate is one or more of potassium phosphate, sodium hydrogen phosphate, or sodium phosphate. The phosphate is one or more of potassium phosphate, sodium hydrogen phosphate, or sodium phosphate. The tungstate is one or more of potassium tungstate, sodium tungstate, or lithium tungstate. The chloride salt is one or more of potassium chloride or sodium chloride. The molybdate is one or more of potassium molybdate or sodium molybdate. The chlorinated salt is one or more of potassium chloride or sodium chloride; the fluorinated salt is one or more of potassium fluoride or sodium fluoride. The carbonate is one or more of potassium carbonate or sodium carbonate. The metaborate is one or more of potassium metaborate, sodium metaborate, or lithium metaborate. The borate is one or more of potassium metaborate, sodium metaborate, or lithium metaborate. The alkaline hydroxide is one or more of sodium hydroxide, potassium hydroxide, or lithium hydroxide.

In some embodiments, the above-described soluble nickel salt, soluble bismuth salt, soluble titanium salt, or the like, in addition to metal salts or inorganic salts, etc., as described above, may be adjusted or set accordingly based on the actual preparation needs.

By introducing other elements into the layered hydroxide, it is also possible to enhance the bonding force between the metal and the oxygen layer, effectively improving the structural stability and cycling reversibility of the composite positive electrode material in the charging and discharging process.

According to some embodiments of the present disclosure, a positive electrode plate for an alkaline secondary battery is provided. The positive electrode plate for an alkaline secondary battery is made from the positive electrode material of a low-cost alkaline secondary battery as described in the above embodiments.

In some embodiments, the positive electrode material of a low-cost alkaline secondary battery is supplemented with an additive having a mass fraction within a range of 0.5%-10%. The additive is one or two of chromium oxide, chromium hydroxide, strontium oxide, strontium hydroxide, ytterbium oxide, or antimony doped tin oxide.

In some embodiments, the additive in the above embodiments, in addition to chromium oxide or chromium hydroxide, etc., as described above, may be adjusted or set accordingly based on the actual preparation needs.

In some embodiments, the mass fraction of the additive is within a range of 2.5%-8%. As another example, the mass fraction of the additive is within a range of 3.5%-6%. As yet another example, the mass fraction of the additive is within a range of 4.5%-5%.

In some embodiments, the mass fraction of the additive in the above embodiments may be adjusted or set accordingly based on actual preparation needs. For example, the mass fraction of the additive is within a range of 0.3%-12%, or the like.

In some embodiments of the present disclosure, the alkaline secondary battery includes a battery housing, an electrode plate set sealed in the battery housing, and an electrolyte. The electrode plate set includes a positive electrode plate, a negative electrode plate, and a diaphragm. The positive electrode plate includes the alkaline secondary battery positive electrode plate as described in the above embodiment. The electrolyte is any feasible electrolyte, such as an alkaline solution of potassium hydroxide, and the electrolyte is added with sodium hexafluoroantimonate with a mass fraction within a range of 0.1%-2%.

In some embodiments, the mass fraction of the sodium hexafluoroantimonate in the above embodiments may be adjusted or set accordingly based on the actual preparation needs. For example, the mass fraction of the sodium hexafluoroantimonate is within a range of 0.05%-2.5%, or the like.

In some embodiments, one or more physical properties such as the shape of the battery housing are pre-set based on the actual preparation needs.

The following is a further detailed description of the foregoing contents of the present disclosure by means of embodiments, but it should not be construed as meaning that the scope of the foregoing subject matter of the present disclosure is limited to the following embodiments. Any technology realized on the basis of the above contents of the present disclosure is within the scope of the present disclosure.

Embodiment 1

A composite positive electrode material $MnO_2$/$[Ni_{0.8}Bi_{0.1}Al_{0.1}(OH)_2\cdot[(A^{a-})_b\cdot mH_2O]$ ($A=Cl^-$, $b=0.1$, $m=2$) is prepared as follows.

In some embodiments, nickel nitrate, bismuth nitrate, and aluminum chloride were first mixed at a molar ratio of Ni:Bi:Al=0.8:0.1:0.1 in a fume hood, and then prepared at 25° C. to form a compound salt solution with a molar concentration of 0.5 mol/L. Potassium hydroxide was dissolved in deionized water to formulate an alkaline solution with a molar concentration of 3 mol/L. The alkaline solution was added dropwise to the compound salt solution at 25° C. using an infusion pump (e.g., a peristaltic pump, etc.) with constant stirring until the pH of the reaction suspension liquid reached 7.5. The reaction suspension liquid refers to the suspension liquid during the reaction of the alkaline solution with the compound salt solution.

In some embodiments, the suspension liquid obtained after the reaction of the alkaline solution with the compound salt solution was reacted at 80° C. for 20 hours, cooled to room temperature (e.g., 25° C.), and then filtered, washed, and dried to obtain a powder. The powder was transferred to a sodium chloride solution at a molar concentration of 0.5 mol/L. The sodium chloride solution with the powder was treated at 150° C. for 12 hours under the protection of inert gas (e.g., nitrogen, etc.), filtered, washed, and dried to obtain the layered hydroxide.

In some embodiments, the manganese dioxide is ball-milled, processed, and sieved to obtain a processed manganese dioxide precursor. The processed manganese dioxide precursor and the layered hydroxide prepared as described above were mixed in a mass ratio of 3:1 to obtain a mixture and then the mixture was subjected to a high-energy ball-milling processing to obtain a composite positive electrode material including the manganese dioxide and nickel-bismuth multilayered hydroxide. A scanning electron microscopy, an elemental distribution, an XRD pattern, and a charge/discharge curve of the composite positive electrode material are shown in FIGS. 1-4.

Figure 2:
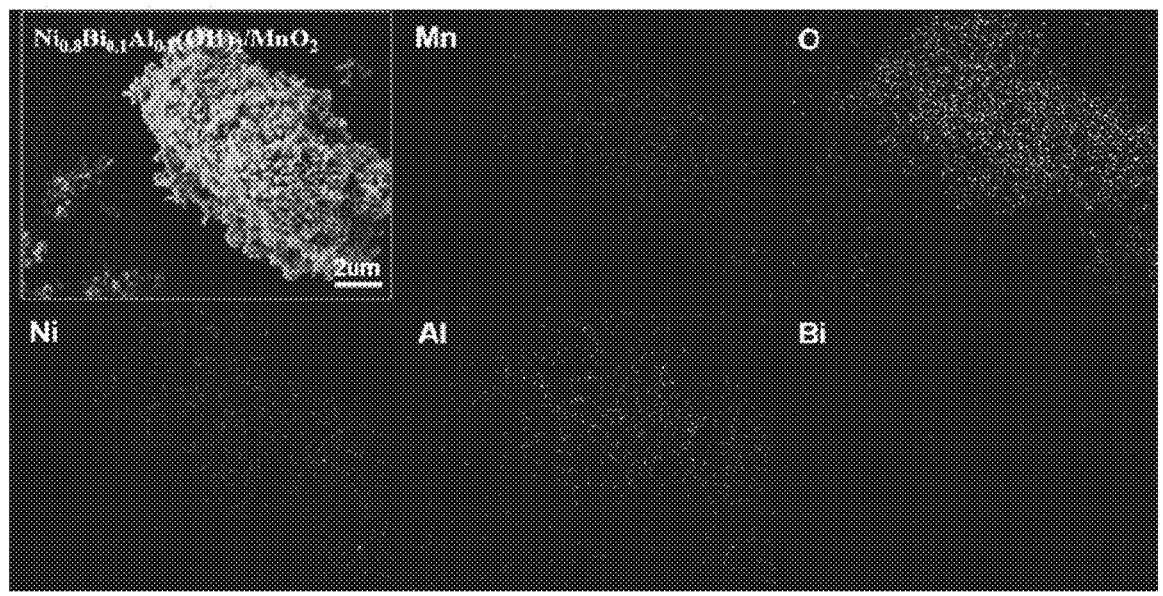
FIG. 2 is a diagram illustrating a distribution of elements of a composite positive electrode material prepared in embodiment 1.
Figure 3:
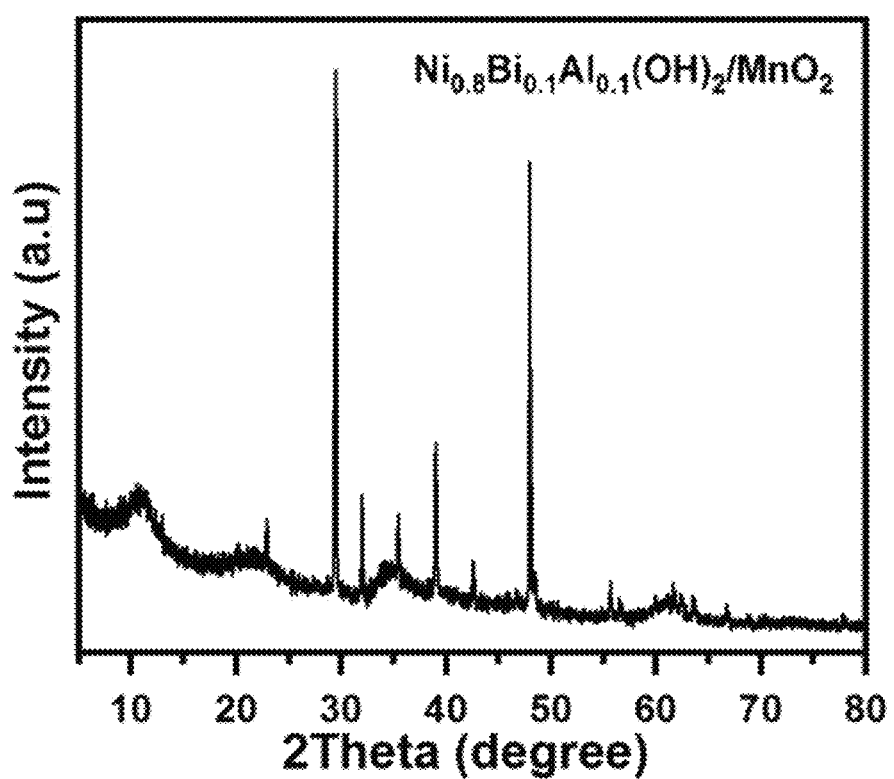
FIG. 3 is a diagram illustrating an XRD plot of a composite positive electrode material prepared in embodiment 1.
Figure 4:
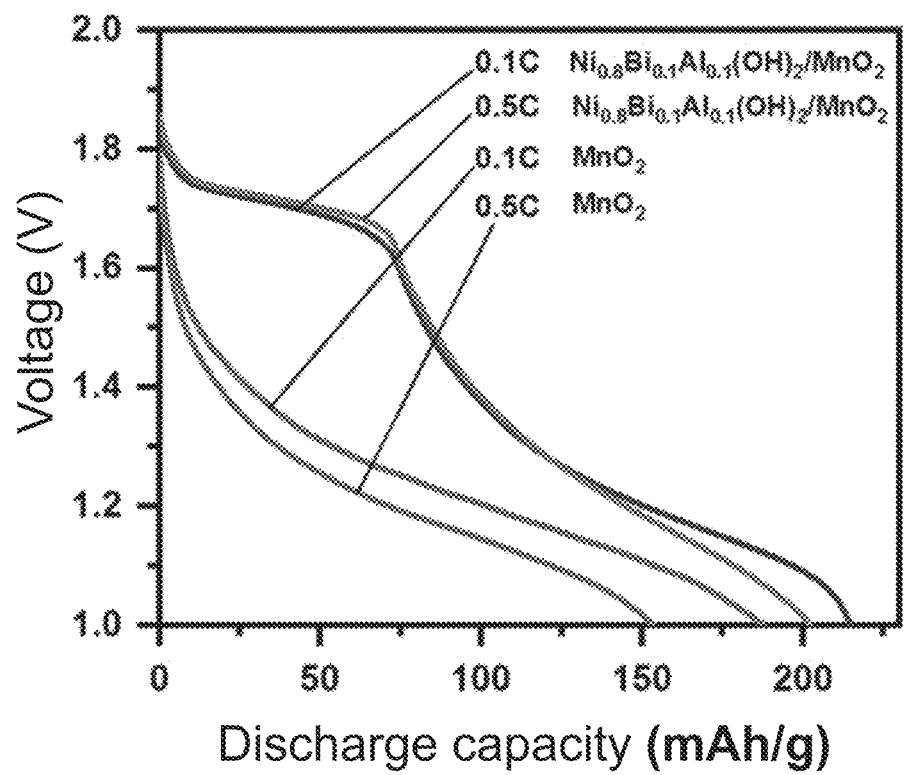
FIG. 4 is a diagram illustrating a discharge curve of a composite positive electrode material and $MnO_2$ prepared in embodiment 1.

FIG. 1 is a scanning electron micrograph of a composite positive electrode material prepared in embodiment 1. FIG. 2 is a diagram illustrating a distribution of elements of the composite positive electrode material prepared in embodiment 1. FIG. 3 is a diagram illustrating an XRD photo of the composite positive electrode material prepared in embodiment 1. FIG. 4 is a diagram illustrating a discharge curve of the composite positive electrode material and $MnO_2$ prepared in embodiment 1. The diagram illustrating the distribution of the elements is obtained by an energy spectrometer, etc. The XRD photo is obtained by an X-ray diffractometer, etc.

Embodiment 2

The composite positive electrode material including $MnO_2$ and the partially oxidized layered hydroxide $[Ni_{0.7}Bi_{0.2}Cu_{0.1}(OH)_2\cdot[(A^{a-})_b\cdot mH_2O]$ ($A=WO_4^{2-}$, $OH^-$, $n=0.2$, $m=2$) is prepared as follows.

In some embodiments, nickel chloride, bismuth nitrate, and copper chloride were first mixed in a molar ratio of Ni:Bi:Cu=0.7:0.2:0.1 in a fume hood and then formulated at room temperature into a compound salt solution with a molar concentration of 0.4 mol/L. Sodium hydroxide was dissolved in deionized water to form an alkaline solution with a molar concentration of 2 mol/L. The alkaline solution was added dropwise to the compound salt solution at room temperature with constant stirring until the pH of the reaction suspension liquid reached 9.

In some embodiments, the suspension liquid after the reaction of the alkaline solution with the compound salt solution is reacted at 90° C. for 10 hours, cooled to room temperature, filtered, washed, and dried to obtain powder. The powder was transferred to an alkaline solution of sodium tungstate at a molar concentration of 0.5 mol/L. The alkaline solution with the powder was treated at 120° C. for 15 hours under the protection of inert gas nitrogen, filtered, and washed to obtain a layered hydroxide sample. Under the protection of nitrogen, 5 g of the layered hydroxide sample was added to 100 ml of solution dissolved with 5 g of potassium persulfate and 2M potassium hydroxide and stirred for 20 minutes, filtered, washed, and dried under vacuum at 80° C. for 5 hours to obtain partially oxidized layered hydroxide.

In some embodiments, the manganese dioxide was ball-milled, processed, and sieved to obtain a processed manganese dioxide precursor. The composite positive electrode material including $MnO_2$ and the partially oxidized layered hydroxide was obtained by mixing the spare manganese dioxide precursor and the partially oxidized layered hydroxide prepared as described above in a mass ratio of 2:1 to obtain a mixture and then the mixture was then subjected to high-energy ball-milling processing.

Embodiment 3

The composite positive electrode material including $MnO_2$ and the layered hydroxide $[Ni_{0.6}Bi_{0.2}Sb_{0.2}OOH\cdot[(A^{a-})_b\cdot mH_2O]$ ($A=MoO_4^{2-}$, $OH^-$, $b=0.2$, $m=2$) is prepared as follows.

In some embodiments, nickel sulfate, bismuth nitrate, and antimony chloride were first mixed at a molar ratio of Ni:Bi:Sb=0.6:0.2:0.2 in a fume hood and then formulated at room temperature to form a compound salt solution with a molar concentration of 1.0 mol/L. Sodium hydroxide was dissolved in deionized water to formulate an alkaline solution with a molar concentration of 1 mol/L. At room temperature, the alkaline solution was added dropwise to the compound salt solution with constant stirring until the pH of the reaction suspension liquid reached 8.5.

In some embodiments, the suspension liquid after the reaction of the alkaline solution with the compound salt solution was reacted at 60° C. for 24 hours, cooled to room temperature, filtered, washed, and dried to obtain powder. The powder was transferred to an alkaline solution of sodium molybdate at a molar concentration of 3 mol/L. The alkaline solution with the powder was treated at 180° C. for 4 hours under the protection of the inert gas, nitrogen, and filtered, washed, and dried to obtain the layered hydroxide. Under the protection of nitrogen, 5 g of layered hydroxide was added to 100 mL of solution dissolved with 15 g of potassium persulfate and 4M potassium hydroxide and stirred for 60 minutes, filtered, washed, and dried in vacuum at 80° C. for 5 hours, and the layered hydroxide was obtained.

In some embodiments, the manganese dioxide is ball-milled and processed and sieved to obtain a spare manganese dioxide precursor. The spare manganese dioxide precursor, the layered hydroxide prepared above are mixed at a mass ratio of 4:1 to obtain a mixture and then the mixture was then subjected to a high-energy ball-milling processing to obtain the composite positive electrode material including $MnO_2$ and the layered hydroxide.

Embodiment 4

The composite positive electrode material including $MnO_2$ and the layered hydroxide $[Ni_{0.8}Bi_{0.1}Ce_{0.05}Zn_{0.05}(OH)_2 \cdot [(A^{a-})_b \cdot mH_2O]$ $(A=F^-, PO_4^{3-}, BO_2^-, n=0.2, m=2)$ is prepared as follows.

In some embodiments, nickel acetate, bismuth nitrate, cerium nitrate, and zinc chloride were first mixed in a molar ratio of Ni:Bi:Ce:Zn=0.8:0.1:0.05:0.05 in a fume hood, and then prepared at room temperature to form a compound salt solution with a molar concentration of 2.0 mol/L. Potassium hydroxide was dissolved in deionized water to formulate an alkaline solution with a molar concentration of 2 mol/L. The alkaline solution was added dropwise to the compound salt solution at room temperature with constant stirring until the pH of the reaction suspension liquid reached 9.

In some embodiments, the suspension liquid after the reaction of the alkaline solution with the compound salt solution is reacted at 80° C. for 12 hours, cooled to room temperature, filtered, washed, and dried to obtain powder. The powder was transferred to a mixed solution of sodium fluoride, sodium phosphate, and sodium metaborate at a molar concentration of 3.0 mol/L (the molar ratio of sodium fluoride, sodium phosphate, and sodium metaborate was 0.2:0.2:1). The solution was treated at 150° C. for 12 hours under the protection of the inert gas, nitrogen, and filtered, washed, and dried to obtain the layered hydroxide.

In some embodiments, the manganese dioxide is ball-milled and processed and sieved to obtain a spare manganese dioxide precursor. The manganese dioxide composite nickel-bismuth multilayered hydroxide composite positive electrode material may be obtained by mixing the spare manganese dioxide precursor, the layered hydroxide prepared as described above in a mass ratio of 5:2 to obtain a mixture and the mixture was then subjected to a high-energy ball-milling processing.

Embodiment 5

The composite positive electrode material including $MnO_2$, layered hydroxide $[Ni_{0.8} Bi_{0.1}Al_{0.05}Y_{0.05} (OH)_2 \cdot [(A^{a-})_n \cdot mH_2O]$ $(A=Cl^-, n=0.2, m=2)$, and graphene composite is prepared as follows.

In some embodiments, the manganese dioxide was first treated by ball-milling and sieved to obtain a spare manganese dioxide precursor. Nickel nitrate, bismuth nitrate, aluminum chloride, and yttrium nitrate were mixed at a molar ratio of Ni:Bi:Al:Y=0.8:0.1:0.05:0.05 in a fume hood and then formulated at 25° C. into a compound salt solution with a molar concentration of 0.5 mol/L. Potassium hydroxide solid was dissolved in deionized water to formulate an alkaline solution with a molar concentration of 3 mol/L. The alkaline solution was added dropwise to the compound salt solution at 25° C. using a peristaltic pump with constant stirring until the pH of the reaction suspension liquid reached 8.

In some embodiments, the suspension liquid after the reaction of the alkaline solution with the compound salt solution is reacted at 80° C. for 12 hours, cooled to room temperature, filtered, washed, and dried to obtain powder. The powder was transferred to a sodium chloride solution with a molar concentration of 0.5 mol/L. The sodium chloride solution with the powder was treated at 150° C. for 12 hours under the protection of inert gas, nitrogen, and filtered, washed, and dried to obtain the layered hydroxide. The spare manganese dioxide precursor, the graphene, and the layered hydroxide prepared were dispersed (e.g., ultrasonically dispersed, etc.) into an aqueous solution according to a mass ratio of 4:1:1 to obtain a mixture and the mixture was then subjected to a freeze-drying process to obtain the composite positive electrode material including $MnO_2$, the layered hydroxide, and the graphene.

Embodiment 6

The composite positive electrode material including $MnO_2$, layered hydroxide $[Ni_{0.6}Bi_{0.2}Sb_{0.2}OOH \cdot [(A^{a-})_n \cdot mH_2O]$ $(A=MoO_4^{2-}, OH^-, n=0.2, m=2)$, and acetylene black is prepared as follows.

In some embodiments, the manganese dioxide solid powder was ground and sieved to obtain a spare manganese dioxide precursor. The spare manganese dioxide precursor, acetylene black, and layered hydroxide prepared in Embodiment 3 were subjected to high-energy ball-milling processing in a mass ratio of 5:2:3 to obtain the composite positive electrode material including $MnO_2$, layered hydroxide, and acetylene black.

Embodiment 7

The composite positive electrode material including $MnO_2$, layered hydroxide $[Ni_{0.8}Bi_{0.1}Ce_{0.05}Zn_{0.05}(OH)_2 \cdot [(A^{a-})_n \cdot mH_2O]$ $(A=F^-, PO_4^{3-}, BO_2^-, n=0.2, m=2)$, and carbon nanotube is prepared as follows.

In some embodiments, the manganese dioxide solid powder was first ground and sieved to obtain a spare manganese dioxide precursor. The spare manganese dioxide precursor, carbon nanotube, and layered hydroxide prepared in embodiment 4 were then subjected to high-energy ball-milling processing in a mass ratio of 6:1:2 to obtain the composite positive electrode material including $MnO_2$, layered hydroxide, and carbon nanotube.

Embodiment 8

The composite positive electrode material including $MnO_2$, layered hydroxide $[Ni_{0.8}Bi_{0.1}Ce_{0.06}Y_{0.04}(OH)_2 \cdot (A^{a-})_n \cdot mH_2O]$ $(A=Cl^-, n=0.2, m=2)$, and flake graphite is prepared as follows.

In some embodiments, nickel acetate, bismuth nitrate, cerium nitrate, and yttrium sulfate were first mixed in a molar ratio of Ni:Bi:Ce:Y=0.8:0.1:0.06:0.04 in a fume hood and then dispensed at room temperature to form a compound salt solution with a molar concentration of 2.0 mol/L. The flake graphite was weighed and ultrasonically dispersed into the compound salt solution, where the mass ratio of the flake graphite and the target-prepared layered hydroxide $[Ni_{0.8}Bi_{0.1}Ce_{0.06}Y_{0.04}(OH)_2 \cdot (A^{a-})_n \cdot mH_2O]$ was controlled to be 1:3. Potassium hydroxide was dissolved in deionized water to formulate an alkaline solution with a molar concentration of 2 mol/L.

In some embodiments, the alkaline solution was added dropwise to the compound salt solution at room temperature with constant stirring until the pH of the reaction suspension liquid reached 9. The suspension liquid after the reaction of the alkaline solution with the compound salt solution was reacted at 80° C. for 12 hours, cooled to room temperature, filtered, washed and dried to obtain powder. The powder was transferred to a mixed solution of sodium chloride at a molar concentration of 1.0 mol/L. The mixed solution of sodium chloride with the powder was treated at 100° C. for 4 hours under the protection of the inert gas, nitrogen, and filtered, washed, and dried to obtain a composite material including the layered hydroxide and flake graphite.

In some embodiments, the manganese dioxide solid powder was ground and sieved to obtain a spare manganese dioxide precursor. The spare manganese dioxide precursor, the above-prepared composite material including the layered hydroxide and flake graphite was subjected to high-energy ball-milling processing at a mass ratio of 3:4 to obtain the composite positive electrode material including the $MnO_2$, layered hydroxide, and flake graphite.

In some embodiments, a positive electrode plate is prepared based on the composite positive electrode material obtained in Embodiments 1-8 as follows. 0.4 g of the composite positive electrode material prepared in each of the embodiments and 0.1 g of superconducting carbon black were ground in a mortar (e.g., an onyx mortar, etc.) for 20 minutes, and mixed well. Then 0.05 g of CMC solution with a mass concentration of 2.5% and 0.05 g of PTFE aqueous solution with a mass concentration of 60% were added to make a positive electrode slurry, the positive electrode slurry is coated onto a nickel foam by a slurry coating mold, and then the nickel foam coated with the positive electrode slurry was dried in a vacuum at 60° C. for 12 hours and pressed under a pressure of 12 MPa for 10 seconds to make a positive electrode plate.

Embodiment 9

A positive electrode plate doped with 5 wt % $Cr(OH)_3$ is prepared as follows.

In some embodiments, 0.375 g of the composite positive electrode material prepared in Embodiment 1 above, 0.025 g of chromium hydroxide, and 0.1 g of superconducting carbon black were ground for 20 minutes in the onyx mortar, and mixed well. Then 0.05 g of CMC solution with a mass concentration of 2.5% and 0.05 g of PTFE aqueous solution with a mass concentration of 60% were added to make a positive electrode slurry, the positive electrode slurry is coated onto the nickel foam by a slurry coating mold, and then the nickel foam coated with the positive electrode slurry was dried in a vacuum at 60° C. for 12 hours and pressed under a pressure of 12 MPa for 10 seconds to make a positive electrode plate.

Embodiment 10

A positive electrode plate dope with 1 wt % $Sr(OH)_2$ and 2 wt % $Cr_2O_3$ is prepared as follows.

In some embodiments, 0.385 g of the composite positive electrode material prepared in Embodiment 2 above, 0.005 g of strontium hydroxide, 0.01 g of chromium oxide, and 0.1 g of superconducting carbon black were ground for 20 minutes in the onyx mortar, and mixed well. Then 0.05 g of CMC solution with a mass concentration of 2.5% and 0.05 g of PTFE aqueous solution with a mass concentration of 60% were added to make a positive electrode slurry, the positive electrode slurry is coated onto the nickel foam by a slurry coating mold, and then the nickel foam coated with the positive electrode slurry was dried in a vacuum at 60° C. for 12 hours and pressed under a pressure of 12 MPa for 10 seconds to make the positive electrode plate.

Embodiment 11

A positive electrode plate dope with 2 wt % $Cr_2O_3$ and 2 wt % antimony doped tin oxide is prepared as follows.

In some embodiments, 0.38 g of the composite positive electrode material prepared in Embodiment 3 above, 0.01 g of chromium oxide, 0.01 g of antimony doped tin oxide, and 0.1 g of superconducting carbon black were ground for 20 minutes in the onyx mortar, and mixed well. Then 0.05 g of CMC solution with a mass concentration of 2.5% and 0.05 g of PTFE aqueous solution with a mass concentration of 60% were added to make a positive electrode slurry, the positive electrode slurry was coated onto the nickel foam by a slurry coating mold, and then the nickel foam coated with the positive electrode slurry was dried in a vacuum at 60° C. for 12 hours and pressed under a pressure of 12 MPa for 10 seconds to make the positive electrode plate.

Embodiment 12

A positive electrode plate dope with 5 wt % YbO is prepared as follows.

In some embodiments, 0.375 g of the composite positive electrode material prepared in Embodiment 4 above, 0.025 g of ytterbium oxide, and 0.1 g of superconducting carbon black were ground for 20 minutes in the onyx mortar, and mixed well. Then 0.05 g of CMC solution with a mass concentration of 2.5% and 0.05 g of PTFE aqueous solution with a mass concentration of 60% were added to make a positive electrode slurry, the positive electrode slurry was coated onto the nickel foam by a slurry coating mold, and then the nickel foam coated with the positive electrode slurry was dried in a vacuum at 60° C. for 12 hours and pressed under a pressure of 12 MPa for 10 seconds to make the positive electrode plate.

In some embodiments, the battery of Embodiments 1-12 was assembled as follows. A special diaphragm (e.g., a microporous polypropylene membrane, etc.) for zinc-nickel batteries was arranged between the prepared positive electrode plate and a negative electrode plate (e.g., a zinc negative electrode plate, etc.) to obtain an intermediate structure and the intermediate structure were mounted in a special simulated battery housing, and an electrolyte (e.g., a saturated zinc oxide with a 6 mol/L KOH solution containing 0.2% sodium hexafluoroantimonate) was injected to the special simulated battery housing to form a semi-sealed zinc-manganese secondary battery.

Comparative Example 1

In some embodiments, manganese dioxide was used as an active substance. The positive electrode plate was prepared as follows. 0.4 g of manganese dioxide and 0.1 g of superconducting carbon black were milled for 20 minutes in the onyx mortar and mixed well. Then 0.05 g of CMC solution with a mass concentration of 2.5% and 0.05 g of PTFE aqueous solution with a mass concentration of 60% were added to make a positive electrode slurry, the positive electrode slurry was coated onto the nickel foam by a slurry coating mold, and then the nickel foam coated with the positive electrode slurry was dried in a vacuum at 60° C. for 12 hours and pressed under a pressure of 12 MPa for 10 seconds to make the positive electrode plate. A special diaphragm (e.g., a microporous polypropylene membrane, etc.) for zinc-nickel batteries was arranged between the prepared positive electrode plate and a negative electrode plate to obtain an intermediate structure and the intermediate structure were mounted in a special simulated battery housing, and an electrolyte (e.g., 6 mol/L KOH solution of saturated zinc oxide) was injected to the special simulated battery housing to form a semi-sealed zinc-manganese secondary battery.

In some embodiments, battery performance was tested as follows. The zinc-manganese secondary batteries fabricated in Embodiments 1-12 and Comparative example 1 were tested for discharge capacity performance and cycling stability performance after being activated by an activation current of 0.2 C. For each of the zinc-manganese secondary batteries fabricated in Embodiments 1-12 and Comparative example 1, after being charged by a 0.2 C charging current, the zinc-manganese secondary battery was set aside for 10 minutes, discharged to a termination voltage of 1.0 V at a discharge rate of 0.2 C, and the discharge capacity performance of the positive electrode material was determined by cycling 150 times. The test results of the charging and discharging performance of the zinc-manganese secondary batteries are listed in Table 1.

TABLE 1

Test of battery charging/discharging performance

| Battery type | | Positive electrode material | 0.1 C gravimetric capacity (mAh·g$^{-1}$) | 0.5 C gravimetric capacity (mAh·g$^{-1}$) | Capacity insurance rate % |
|---|---|---|---|---|---|
| Embodiment 1 | Doping of different elements | $MnO_2$/[$Ni_{0.8}Bi_{0.1}Al_{0.1}(OH)_2$•[($A^{a-}$)$_n$•$mH_2O$] (A=$Cl^-$) | 214.8 | 202.2 | 85.9 |
| Embodiment 2 | | $MnO_2$/partially oxidized [$Ni_{0.7}Bi_{0.2}Cu_{0.1}(OH)_2$•[($A^{a-}$)$_n$•$mH_2O$](A=$WO_4^{2-}$, $OH^-$) | 226.2 | 212.6 | 87.6 |
| Embodiment 3 | | $MnO_2$/[$Ni_{0.6}Bi_{0.2}Sb_{0.2}OOH$•[($A^{a-}$)$_n$•$mH_2O$] (A=$MoO_4^{2-}$, $OH^-$) | 201.0 | 189.2 | 90.3 |
| Embodiment 4 | | $MnO_2$/[$Ni_{0.8}Bi_{0.1}Ce_{0.05}Zn_{0.05}$•[($A^{a-}$)$_n$•$mH_2O$] (A=$F^-$, $PO_4^{3-}$, $BO_2^-$) | 219.5 | 208.2 | 88.8 |
| Embodiment 5 | Doping of different conductive materials | $MnO_2$/[$Ni_{0.8}Bi_{0.1}Al_{0.05}Y_{0.05}(OH)_2$•[($A^{a-}$)$_n$•$mH_2O$](A=$Cl^-$)/graphene | 237.1 | 219.2 | 91.2 |
| Embodiment 6 | | $MnO_2$/[$Ni_{0.6}Bi_{0.2}Sb_{0.2}OOH$•[($A^{a-}$)$_n$•$mH_2O$] (A=$MoO_4^{2-}$, $OH^-$)/acetylene black | 249.9 | 225.6 | 93.6 |
| Embodiment 7 | | $MnO_2$/[$Ni_{0.8}Bi_{0.1}Ce_{0.05}Zn_{0.05}(OH)_2$•[($A^{a-}$)$_n$•$mH_2O$](A=$F^-$, $PO_4^{3-}$, $BO_2^-$)/carbon nanotube | 232.1 | 221.2 | 92.8 |
| Embodiment 8 | | $MnO_2$/[$Ni_{0.8}Bi_{0.1}Ce_{0.06}Y_{0.04}(OH)_2$•($A^{a-}$)$_n$•$mH_2O$](A=$Cl^-$)/scale graphite | 243.8 | 219.0 | 94.2 |
| Embodiment 9 | Adding different additives | Material in Embodiment 1 + 5 wt % $Cr(OH)_3$ | 222.2 | 207.5 | 87.5 |
| Embodiment 10 | | Material in Embodiment 2 + 1 wt % $Sr(OH)_2$ + 2 wt % $Cr_2O_3$ | 228.0 | 216.3 | 88.8 |
| Embodiment 11 | | Material in Embodiment 3 + 2 wt % $Cr_2O_3$ + 2 wt % Sb-doped SnO | 212.5 | 198.7 | 92.6 |
| Embodiment 12 | | Material in Embodiment 4 + 5 wt % YbO | 225.3 | 212.4 | 90.5 |
| Comparative example 1 | | $MnO_2$ | 188.4 | 152.2 | 12.3% |

The 0.1 C gravimetric capacity refers to the amount of electricity that may be discharged by the zinc-manganese secondary battery when discharged at a discharge rate of 0.1 C. The 0.5 C gravimetric capacity is the amount of electricity that may be discharged when the zinc-manganese secondary battery is discharged at a discharge rate of 0.5 C. The capacity insurance rate is used to measure the capacity retention of the zinc-manganese secondary battery after a period of use.

As can be seen from Table 1 and FIG. 4 above, the composite positive electrode material prepared using the embodiments of the present disclosure has better cycling stability performance and a higher discharge voltage platform. The improved cycling stability is mainly attributed to the modifying effect of the layered hydroxide material on the structural lattice of the $MnO_2$ positive electrode material. In particular, the presence of a plurality of beneficial metal elements and the nano-layered structural morphology greatly reduces the deformation of the positive electrode in the process of reaction and inhibit the generation of inert irreversible substances, thus improving the reversible charging and discharging performance of the positive electrode in the process of charging and discharging. The cycling stability of the positive electrode may be improved by doping different excellent positive electrode additives and improving the properties of the $MnO_2$ electrode. At the same time, the selection of the effective additive sodium hexafluoroantimonate to the electrolyte may improve the overall electrical performance of the battery, which is conducive to the enhancement of the battery discharge platform and discharge capacity.

Embodiment 13

The composite positive electrode material including $MnO_2$ and layered hydroxide $[Ni_{0.8}Ti_{0.2}(OH)_2 \cdot [(A^{a-})_n \cdot mH_2O]$ $(A=NO_3^-, n=0.1, m=2)$ is prepared as follows.

In some embodiments, nickel nitrate and titanium sulfate were first mixed at a molar ratio of Ni:Ti=0.8:0.2, and then formulated into a compound salt solution with a molar concentration of 0.5 mol/L at 25° C. Potassium hydroxide was dissolved in deionized water to formulate an alkaline solution with a molar concentration of 3 mol/L. The alkaline solution was added dropwise to the compound salt solution at 25° C. with a peristaltic pump, with constant stirring until the pH of the reaction suspension liquid reached 9.

In some embodiments, the suspension liquid after the reaction of the alkaline solution with the compound salt solution was reacted at 80° C. for 12 hours, cooled to room temperature, filtered, washed, and dried to obtain powder. The powder was transferred to a sodium nitrate solution with a molar concentration of 0.5 mol/L. The sodium nitrate solution with the powder was treated at 130° C. for 1 hour under the protection of inert gas, nitrogen, and filtered, washed, and dried to obtain the layered hydroxide. Then the manganese dioxide precursor obtained by electrolysis and the layered hydroxide were mixed at a mass ratio of 3:1 to obtain a mixture and the mixture was then subjected to a high-energy ball-milling processing to obtain the composite positive electrode material including $MnO_2$ and layered hydroxide $[Ni_{0.8}Ti_{0.2}(OH)_2 \cdot [(A^{a-})_n \cdot mH_2O]$.

Figure 5:
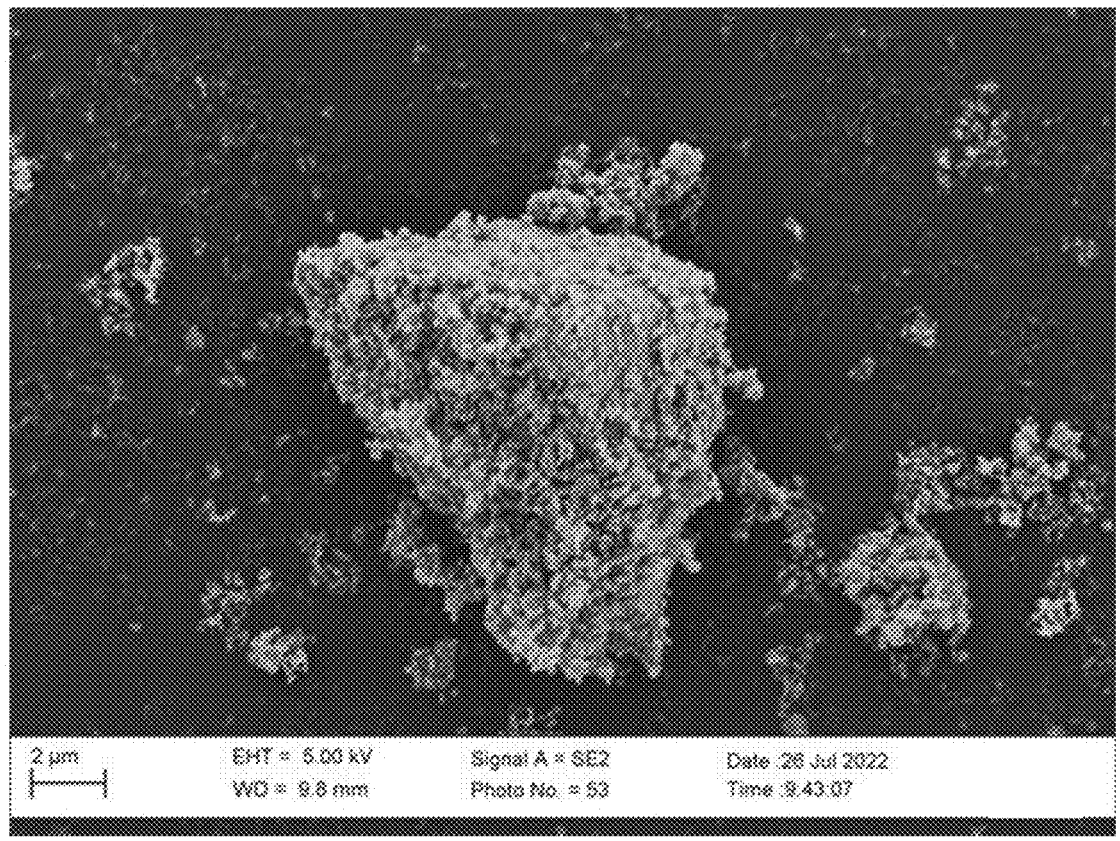
FIG. 5 is a scanning electron microscope image of a composite positive electrode material prepared in embodiment 13.
Figure 6:
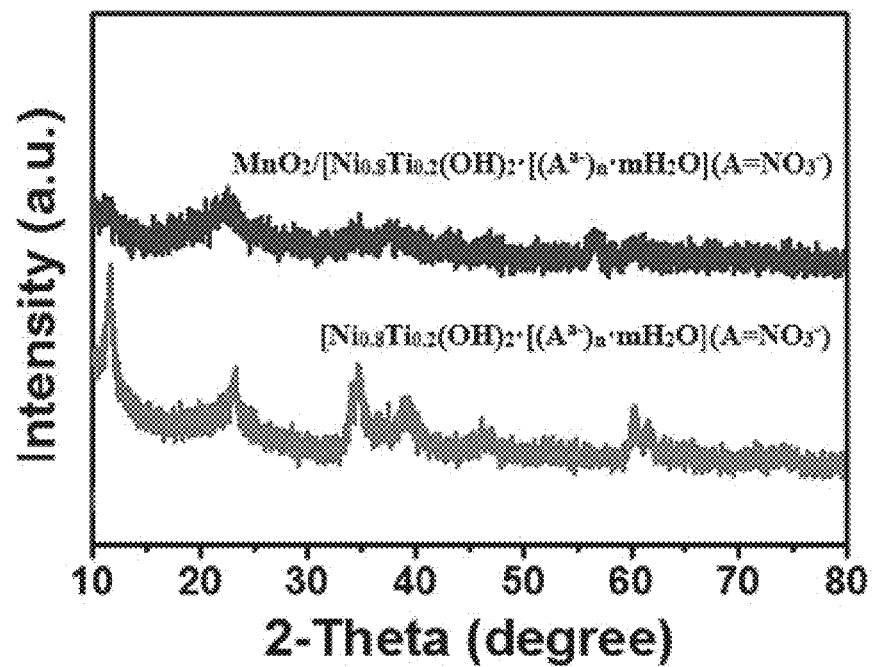
FIG. 6 is a diagram illustrating an XRD plot of a composite positive electrode material prepared in embodiments 13 and 14.
Figure 7:
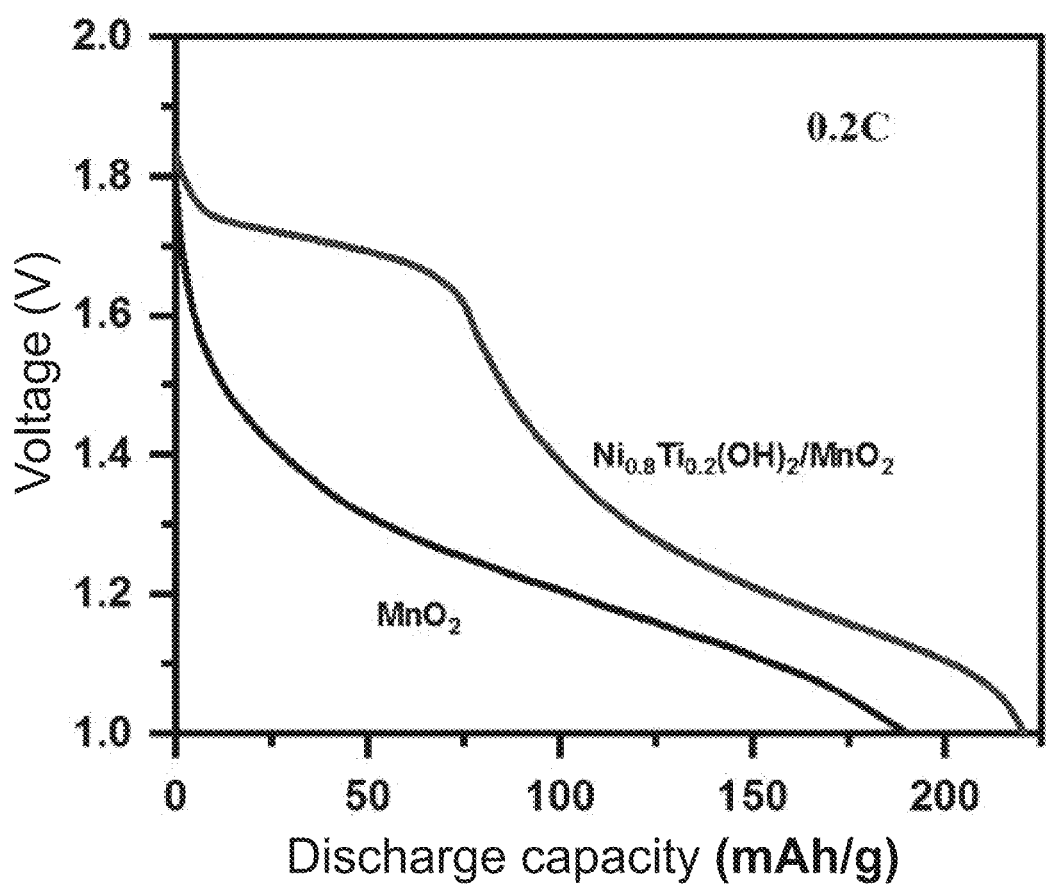
FIG. 7 is a diagram illustrating a discharge curve of a composite positive electrode material and $MnO_2$ prepared in embodiment 13.

FIG. 5 is a scanning electron microscope image of a composite positive electrode material prepared in embodiment 13. FIG. 6 is a diagram illustrating an XRD plot of a composite positive electrode material prepared in embodiments 13 and 14. FIG. 7 is a diagram illustrating a discharge curve of a composite positive electrode material and $MnO_2$ prepared in embodiment 13.

Embodiment 14

The composite positive electrode material including $MnO_2$m and layered hydroxide $[Ni_{0.75}Ti_{0.15}Zn_{0.1}(OH)_2 \cdot [(A^{a-})_n \cdot mH_2O]$ $(A=SO_4^{2-}, OH, n=0.1, m=2)$ is prepared as follows.

In some embodiments, nickel sulfate, titanium sulfate, and zinc sulfate were mixed in a molar ratio of Ni:Ti:Cu=0.7:0.2:0.1 and then formulated into a compound salt solution with a molar concentration of 0.4 mol/L at room temperature. Sodium hydroxide was dissolved in deionized water to formulate an alkaline solution with a molar concentration of 2 mol/L. The alkaline solution was added dropwise to the compound salt solution at room temperature with constant stirring until the pH of the reaction suspension liquid reached 9.

In some embodiments, the suspension liquid after the reaction of the alkaline solution with the compound salt solution is reacted at 90° C. for 10 hours, cooled to room temperature, filtered, washed, and dried to obtain the layered hydroxide. The manganese dioxide was treated by ball-milling and sieved to obtain manganese dioxide precursor. The manganese dioxide precursor, the produced layered hydroxide was mixed at a mass ratio of 2:1 to obtain a mixture and then the mixture was subjected to a high-energy ball-milling processing to obtain manganese dioxide composite nickel-titanium multilayered hydroxide composite positive electrode material.

Embodiment 15

The composite positive electrode material including $MnO_2$ and layered hydroxide $[Ni_{0.7}Ti_{0.1}Co_{0.1}Y_{0.1}(OH)_2 \cdot [(A^{a-})_n \cdot mH_2O]$ $(A=WO_4^{2-}, OH^-, n=0.1, m=2)$ is prepared as follows.

In some embodiments, nickel sulfate, titanium sulfate, cobalt sulfate, and yttrium nitrate were first mixed in a molar ratio of Ni:Ti:Co:Y=0.7:0.15:0.1:0.05, and then formulated at room temperature into a compound salt solution with a molar concentration of 1.6 mol/L. Sodium hydroxide was dissolved in deionized water to formulate an alkaline solution with a molar concentration of 2.5 mol/L. At room temperature, the alkaline solution was added dropwise to the compound salt solution with constant stirring until the pH of the reaction suspension liquid reached 8.

In some embodiments, the suspension liquid after the reaction of the alkaline solution with the compound salt solution was reacted at 60° C. for 18 hours, cooled to room temperature, filtered, washed, and dried to obtain a powder. The powder was transferred to an alkaline solution of sodium tungstate at a molar concentration of 2 mol/L. The alkaline solution with the powder was treated at 120° C. for 4 hours under the protection of the inert gas nitrogen, and filtered, washed, and dried to obtain the layered hydroxide. The manganese dioxide was ball-milled and sieved to obtain a manganese dioxide precursor. The manganese dioxide precursor and the layered hydroxide were mixed at a mass ratio of 1:1 to obtain a mixture and the mixture was then subjected to a high-energy ball-milling processing to obtain the composite positive electrode material including $MnO_2$ and layered hydroxide.

Embodiment 16

The composite positive electrode material including $MnO_2$ and partially oxidized layered hydroxide $[Ni_{0.8}Ti_{0.1}Ca_{0.1}(OH)_2\cdot[(A^{a-})_n\cdot mH_2O]$ (A=F$^-$, MoO$_4^{3-}$, n=0.2, m=2) is prepared as follows.

In some embodiments, nickel acetate, titanium sulfate, and calcium chloride were first mixed at a molar ratio of Ni:Ti:Ca=0.8:0.1:0.1, and then formulated into a compound salt solution with a molar concentration of 2.0 mol/L at room temperature. Potassium hydroxide was dissolved in deionized water to formulate an alkaline solution with a molar concentration of 2 mol/L. The alkaline solution was added dropwise to the compound salt solution at room temperature with constant stirring until the pH of the reaction suspension liquid reached 9.

In some embodiments, the suspension liquid after the reaction of the alkaline solution with the compound salt solution was reacted at 80° C. for 12 hours, cooled to room temperature, filtered, washed, and dried to obtain powder. The powder was transferred to a mixture of sodium fluoride and sodium molybdate at a molar concentration of 3.0 mol/L (the molar ratio of sodium fluoride to sodium molybdate was 2:1). The mixture of sodium fluoride and sodium molybdate with the powder was treated at 150° C. for 12 hours under the protection of the inert gas nitrogen, and filtered, washed, and dried to obtain the layered hydroxide. Then, under the protection of nitrogen, 5 g of layered hydroxide was added to 100 mL of a solution dissolved with 5 g of potassium persulfate and 1.0 M potassium hydroxide solution and stirred for 30 minutes, filtered, washed, and dried in a vacuum at 80° C. for 5 hours to obtain partially oxidized layered hydroxide.

In some embodiments, the manganese dioxide was ball-milled and sieved to obtain the manganese dioxide precursor. The composite positive electrode material including MnO$_2$ and partially oxidized layered hydroxide was obtained by mixing the manganese dioxide precursor and the partially oxidized layered hydroxide in a mass ratio of 5:3 to obtain a mixture and the mixture was then subjected to high-energy ball-milling processing.

Embodiment 17

The composite positive electrode material including MnO$_2$, layered hydroxide $[Ni_{0.8}Ti_{0.1}Al_{0.1}OOH\cdot[(A^{a-})_n\cdot mH_2O]$ (A=PO$_4^{3-}$, n=0.2, m=2), and carbon nanotubes is prepared as follows.

In some embodiments, nickel nitrate, titanium sulfate, and aluminum chloride were first mixed at a molar ratio of Ni:Ti:Al=0.8:0.1:0.1, and then formulated into a compound salt solution with a molar concentration of 0.5 mol/L at 25° C. The carbon nanotube was then ultrasonically dispersed into the compound salt solution, with a mass percent of carbon nanotube of about 2.5%. Potassium hydroxide solid was dissolved in deionized water to formulate an alkaline solution with a molar concentration of 3 mol/L. The alkaline solution was added dropwise to the compound salt solution at 25° C. using a peristaltic pump with constant stirring until the pH of the suspension liquid solution reached 8.

In some embodiments, the suspension liquid after the reaction of the alkaline solution with the compound salt solution was reacted at 80° C. for 12 hours, cooled to room temperature, filtered, washed, and dried to obtain powder. The powder was transferred to a sodium phosphate solution at a molar concentration of 0.5 mol/L. The sodium phosphate solution with the powder was treated at 150° C. for 12 hours under the protection of inert gas nitrogen, and filtered, washed, and dried to obtain a composite including the layered hydroxide and the carbon nanotube. Then, under the protection of nitrogen, 5 g of the composite material including the layered hydroxide and the carbon nanotube was added to 100 mL of a solution dissolved with 15 g of potassium persulfate and 3M of potassium hydroxide and stirred for 70 minutes, filtered, washed, and dried, and dried in a vacuum at 60° C. for 8 hours, then the composite including the layered hydroxide and the carbon nanotube was obtained. Finally, the manganese dioxide obtained by electrolysis and the composite including the layered hydroxide and the carbon nanotube were mixed according to the mass ratio of 3:2 to obtain a mixture and the mixture was then subjected to a ball-milling processing to obtain the composite including MnO$_2$, layered hydroxide, and carbon nanotube composite positive electrode material.

Embodiment 18

The composite including MnO$_2$, layered hydroxide $[Ni_{0.6}Ti_{0.15}Sb_{0.1}Ce_{0.1}Bi_{0.05}OOH\cdot[(A^{a-})_n\cdot mH_2O]$ (A=Cl$^-$, n=0.2, m=2), and titanium nitride is prepared as follows.

In some embodiments, nickel chloride, titanium sulfate, antimony chloride, cerium nitrate, and bismuth nitrate were firstly mixed in a molar ratio of Ni:Ti:Sb:Ce:Bi=0.6:0.15:0.1:0.1:0.05, and formulated at room temperature into a compound salt solution with a molar concentration of 1.8 mol/L. Potassium hydroxide solid was dissolved in deionized water to formulate an alkaline solution with a molar concentration of 2.5 mol/L. The alkaline solution was added dropwise to the compound salt solution at 25° C. with a peristaltic pump, with constant stirring until the pH of the reaction suspension liquid reached 8.5.

In some embodiments, the suspension liquid after the reaction of the alkaline solution with the compound salt solution was reacted at 80° C. for 12 hours, cooled to room temperature, filtered, washed, and dried to obtain powder. The powder is transferred to a sodium chloride solution with a molar concentration of 1.0 mol/L. The sodium chloride solution with the powder was treated at 120° C. for 3 hours under the protection of the inert gas nitrogen, and filtered, washed, and dried to obtain the layered hydroxide. Then, under the protection of nitrogen, 5 g of layered hydroxide was added to 100 mL of a solution dissolved with 15 g of potassium persulfate and 3M of potassium hydroxide and stirred for 70 minutes, filtered, washed, and dried in a vacuum at 60° C. for 8 hours to obtain the layered hydroxide. The manganese dioxide solid powder obtained by electrolysis was ground and sieved to obtain a manganese dioxide precursor. The manganese dioxide precursor, titanium nitride, and prepared layered hydroxides were ultrasonically dispersed into an aqueous solution at a mass ratio of 5:1:4, stirred at 50° C. for 2 hours, and freeze-dried to obtain the composite positive electrode material including MnO$_2$, layered hydroxide, and graphene.

Embodiment 19

A positive electrode plate doped with 1 wt % Sr(OH)$_2$ and 2 wt % Sb doped SnO are prepared as follows.

In some embodiments, 0.385 g of the composite positive electrode material prepared in Embodiment 15 above, 0.005 g of strontium hydroxide, 0.01 g of antimony doped tin oxide, and 0.1 g of superconducting carbon black were ground for 20 minutes in an onyx mortar and mixed homogeneously to form a mixture. Then 0.05 g of CMC solution with a mass concentration of 2.5% and 0.05 g of PTFE aqueous solution with a mass concentration of 60% were added to the mixture make a positive electrode slurry, the positive electrode slurry was coated onto the nickel foam by a slurry coating mold, and then the nickel foam coated with the positive electrode slurry dried in a vacuum at 60° C. for 12 hours and pressed under a pressure of 12 MPa for 10 seconds to make the positive electrode plate.

In some embodiments, the battery of Embodiments 13-19 was assembled as follows. A special diaphragm for zinc-nickel batteries was arranged between the prepared positive electrode plate and a negative electrode plate to obtain an intermediate structure and the intermediate structure were mounted in a special simulated battery housing, and an electrolyte (e.g., saturated zinc oxide and containing 0.2 wt % of sodium hexaflurorantimonate in a 6 mol/L KOH solution) (e.g., saturated zinc oxide and containing 0.2 wt % of sodium hexaflurorantimonate in a 6 mol/L KOH solution) was injected to the special simulated battery housing to form a semi-sealed zinc-manganese secondary battery.

Comparative Example 2

Manganese dioxide was used as an active substance.

In some embodiments, manganese dioxide was used as the active substance. The positive electrode plate was prepared as follows. 0.39 g of manganese dioxide, 0.01 g of bismuth oxide, 0.1 g of superconducting carbon black, were ground for 20 minutes in an onyx mortar, and mixed well. Then, 0.05 g of CMC solution with a mass concentration of 2.5% and 0.05 g of PTFE aqueous solution with a mass concentration of 60% were added and mixed well to make the positive electrode slurry, and the positive electrode slurry was coated onto the nickel foam through a slurry coating mold. After the nickel foam coated with the positive electrode slurry was dried in a vacuum at 60° C. for 12 hours, the positive electrode plate was pressed under the pressure of 12 MPa for 10 seconds to produce the positive electrode plate. A special diaphragm for zinc-nickel batteries was arranged between the prepared positive electrode plate and a negative electrode plate to obtain an intermediate structure and the intermediate structure were mounted in a special simulated battery housing, and an electrolyte (e.g., a 6 mol/L KOH solution saturated with zinc oxide) was injected to the special simulated battery housing to form a semi-sealed zinc-manganese secondary battery.

In some embodiments, battery performance was tested as follows. The zinc-manganese secondary batteries fabricated in Embodiments 13-21 and Comparative example 2 were tested for discharge capacity performance and cycling stability performance after being activated by an activation current of 0.2 C. For each of the zinc-manganese secondary batteries fabricated in Embodiments 13-21 and Comparative example 2, after being charged by a 0.2 C charging current, the zinc-manganese secondary battery was set aside for 10 minutes, discharged to a termination voltage of 1.0 V at a discharge rate of 0.2 C, and the discharge capacity performance of the positive electrode material was determined by cycling 150 times. The test results of the charging and discharging performance of the zinc-manganese secondary batteries are listed in Table 2.

TABLE 2

| | Test of battery charging/discharging performance | | | |
|---|---|---|---|---|
| Battery type | Positive electrode material | 0.1 C gravimetric capacity (mAh·g$^{-1}$) | 0.5 C gravimetric capacity (mAh·g$^{-1}$) | Capacity insurance rate % |
| Embodiment 13 | $MnO_2/[Ni_{0.8}Ti_{0.2}(OH)_2\bullet[(A^{a-})_n\bullet mH_2O]$ $(A=NO_3^-)$ | 220.3 | 212.5 | 84.9 |
| Embodiment 14 | $MnO_2/[Ni_{0.75}Ti_{0.15}Zn_{0.1}(OH)_2\bullet[(A^{a-})_n\bullet mH_2O]$ $(A=SO_4^{2-}, OH^-)$ | 239.8 | 223.6 | 90.2 |
| Embodiment 15 | $MnO_2/[Ni_{0.7}Ti_{0.1}Co_{0.1}Y_{0.1}(OH)_2\bullet[(A^{a-})_n\bullet mH_2O]$ $(A=WO_4^{2-}, OH^-)$ | 246.9 | 235.2 | 94.6 |
| Embodiment 16 | $MnO_2$/partially oxidized $[Ni_{0.8}Ti_{0.1}Ca_{0.1}(OH)_2\bullet[(A^{a-})_n\bullet mH_2O]$ $(A=F^-, MoO_4^{3-})$ | 233.4 | 222.8 | 91.9 |
| Embodiment 17 | $MnO_2//[Ni_{0.8}Ti_{0.1}Al_{0.1}OOH\bullet[(A^{a-})_n\bullet mH_2O]$ $(A=PO_4^{3-})$/carbon nanotube | 241.6 | 227.0 | 93.7 |
| Embodiment 18 | $MnO_2/$ $[Ni_{0.6}Ti_{0.15}Sb_{0.1}Ce_{0.1}Bi_{0.05}OOH\bullet[(A^{a-})_n\bullet mH_2O]$ $(A=Cl^-)$/titanium nitride | 248.5 | 229.6 | 95.1 |
| Embodiment 19 | Embodiment 15 + 1% $Sr(OH)_2$ + 2% Sb-doped SnO | 259.7 | 242.2 | 96.0 |
| Comparative example 2 | $MnO_2$ | 195.6 | 175.6 | 25.2 |

As can be seen from Table 2 and FIG. 7 above, the composite positive electrode material prepared in the embodiments of the present disclosure has a better cycling stability performance and a higher discharge voltage platform. The improved cycling stability is mainly attributed to the modifying effect of the layered hydroxide on the structural lattice of the $MnO_2$ positive electrode material. In particular, the presence of a plurality of beneficial metal elements and the nano-layered structural morphology greatly reduces the deformation of the positive electrode during the reaction process and inhibits the generation of inert irreversible substances, thus improving the reversible charging and discharging performance of the positive electrode during the charging and discharging process. Doping with different excellent additives and improving the properties of the $MnO_2$ electrodes may improve the cycling stability performance of the positive electrode. At the same time, the selection of effective additive sodium hexafluoroantimonate to the electrolyte may improve the overall electrical performance of the battery, which is conducive to the enhancement of the battery discharge platform and discharge capacity.

The above embodiment describes the basic principles, main features and advantages of the present disclosure. The person skilled in the art should understand that the present disclosure is not limited by the above embodiments, and that the above embodiments and the description in the present disclosure are only illustrative of the principles of the present disclosure. The present disclosure will have various variations and improvements without departing from the scope of the principles of the present disclosure, and these variations and improvements are within the scope of protection of the present disclosure.

In addition, certain features, structures, or characteristics of one or more embodiments of the present disclosure may be suitably combined.

In the event of any inconsistency or conflict between the descriptions, definitions, and/or use of terminology in the materials cited in the present disclosure and those described in the present disclosure, the descriptions, definitions, and/or use of terminology in the present disclosure shall prevail.

What is claimed is:

1. A positive electrode material of a low-cost alkaline secondary battery, comprising:
   a composite positive electrode material including manganese dioxide and layered hydroxide $[Ni_xM_yA_z(OH)_2]\cdot[(B^{a-})_b\cdot mH_2O]$,
   a composite positive electrode material including the manganese dioxide and partially oxidized layered hydroxide $[Ni_xM_yA_z(OH)_2]\cdot[(B^{a-})_b\cdot mH_2O]$,
   a composite positive electrode material including the manganese dioxide and layered hydroxyl oxide $[Ni_xM_yA_zOOH]$, or
   a composite positive electrode material including the manganese dioxide, a conductive material, and one of the layered hydroxide $[Ni_xM_yA_z(OH)_2]\cdot[(B^{a-})_b\cdot mH_2O]$, the partially oxidized layered hydroxide $[Ni_xM_yA_z(OH)_2]\cdot[(B^{a-})_b\cdot mH_2O]$, and the layered hydroxyl oxide $[Ni_xM_yA_zOOH]$, the composite positive electrode material having a three-dimensional structure, wherein M is Bi or Ti, A is one or two of Ce, Al, Zn, Ca, Mg, Co, Y, Ga, Sb, Yb, and Cu, $B^{a-}$ is one of $OH^-$, $Cl^-$, $F^-$, $PO_4^{3-}$, $SO_4^{2-}$, $CO_3^{2-}$, $NO_3^-$, $BO_2^-$, $MoO_4^{2-}$, and $WO_4^{2-}$, wherein a is an integer equal to a number of negative charges of $B^{a-}$, $0.9 \geq x \geq 0.5$, $0.3 \geq y \geq 0.1$, $0.2 \geq z \geq 0.01$, $x+y+z=1$, $b>0$, and $m>0$.

2. The positive electrode material of the low-cost alkaline secondary battery of claim 1, wherein a mass percentage of the layered hydroxide $[Ni_xM_yA_z(OH)_2]\cdot[(B^{a-})_b\cdot mH_2O]$, the partially oxidized layered hydroxide $[Ni_xM_yA_z(OH)_2]\cdot[(B^{a-})_b\cdot mH_2O]$, or the layered hydroxyl oxide $[Ni_xM_yA_zOOH]$ in the composite positive electrode material is within a range of 5%-75%.

3. The positive electrode material of the low-cost alkaline secondary battery of claim 1, wherein the conductive material is one or two of graphene, carbon nanotube, acetylene black, flake graphite, hydroxyl cobalt oxide, nitrogen carbide, titanium carbide, niobium carbide, and titanium nitride, a mass percentage of the conductive material in the composite positive electrode material is within a range of 0.5%-20%; and the manganese dioxide is one or more of $\alpha$-$MnO_2$, $\beta$-$MnO_2$, $\gamma$-$MnO_2$, $\delta$-$MnO_2$, and $\epsilon$-$MnO_2$.

4. A method for preparing the positive electrode material of the low-cost alkaline secondary battery of claim 1, comprising a preparation process of the composite positive electrode material comprising the manganese dioxide and the layered hydroxide $[Ni_xM_yA_z(OH)_2]\cdot[(B^{a-})_b\cdot mH_2O]$ including:
   S1, performing a ball-milling operation and a sieving operation on a manganese dioxide precursor to obtain a processed manganese dioxide precursor
   S2, formulating a compound salt solution by dissolving a soluble nickel salt, a soluble bismuth salt or a soluble titanium salt, and an A-metal salt in deionized water, formulating an alkaline solution by dissolving an alkaline hydroxide in deionized water, adding the alkaline solution to the compound salt solution at a temperature within a range of 15-50° C., and continuous stirring until pH of a suspension liquid being within a range of 7-11, wherein
   the suspension liquid is kept at a temperature within a range of 50-95° C. for 5 to 48 hours, after being cooled to room temperature, the suspension liquid is filtered, washed, and dried to obtain a powder, the powder is transferred to a solution prepared from one or more of alkaline hydroxide, phosphate, tungstate, molybdate, chlorinated salt, fluorinated salt, carbonate, metaborate, and borate, processing the solution including the powder under an inert atmosphere or in air at a temperature within a range of 25-200° C. for 1 to 24 hours, and the layered hydroxide $[Ni_xM_yA_z(OH)_2]\cdot[(B^{a-})_b\cdot mH_2O]$ is obtained by filtering, washing and drying the solution including the powder;
   S3, mixing the processed manganese dioxide precursor obtained from S1 with the layered hydroxide $[Ni_xM_yA_z(OH)_2]\cdot[(B^{a-})_b\cdot mH_2O]$ obtained from S2, and obtaining the composite positive electrode material by performing a high-energy ball-milling operation.

5. A method for preparing the positive electrode material of the low-cost alkaline secondary battery of claim 1, wherein a preparation process of the composite positive electrode material comprising the manganese dioxide and the partially oxidized layered hydroxide $[Ni_xM_yA_z(OH)_2]\cdot[(B^{a-})_b\cdot mH_2O]$ and the composite positive electrode material of the manganese dioxide and the layered hydroxyl oxide $[Ni_xM_yA_zOOH]$ includes:
   S1, performing a ball-milling operation and a sieving operation on a manganese dioxide precursor to obtain a processed manganese dioxide precursor;
   S2, formulating a compound salt solution by dissolving a soluble nickel salt, a soluble bismuth salt or a soluble titanium salt, and an A-metal salt in deionized water, formulating an alkaline solution by dissolving an alkaline hydroxide in deionized water, adding the alkaline solution to the compound salt solution at a temperature within a range of 15-50° C., and continuous stirring until pH of a suspension liquid being within a range of 7-11, wherein the suspension liquid is kept at a temperature within a range of 50-95° C. for 5 to 48 hours, after being cooled to room temperature, the suspension liquid is filtered, washed, and dried to obtain a powder, the powder is transferred to a solution prepared from one or more of alkaline hydroxide, phosphate, tungstate, molybdate, chlorinated salt, fluorinated salt, carbonate, metaborate, and borate, processing the solution including the powder under an inert atmosphere or in air at a temperature within a range of 25-200° C. for 1 to 24 hours, and the partially oxidized layered hydroxide $[Ni_xM_yA_Z(OH)_2]\cdot[(B^{a-})_b\cdot mH_2O]$ or a fully oxidized layered hydroxyl oxide $[Ni_xM_yA_ZOOH]$ is obtained by oxidizing the layered hydroxide by chemical oxidation or electrolytic oxidation;

S3, mixing the processed manganese dioxide precursor obtained from S1 with the partially oxidized layered hydroxide $[Ni_xM_yA_Z(OH)_2]\cdot[(B^{a-})_b\cdot mH_2O]$ or the fully oxidized layered hydroxyl oxide $[Ni_xM_yA_ZOOH]$ obtained from S2, and obtaining the composite positive electrode material by performing a high-energy ball-milling operation.

6. A method for preparing the positive electrode material of the low-cost alkaline secondary battery of claim 1, comprising:

a preparation process of the composite positive electrode material comprising the manganese dioxide, the conductive material, and one of the layered hydroxide $[Ni_xM_yA_Z(OH)_2]\cdot[(B^{a-})_b\cdot mH_2O]$, the partially oxidized layered hydroxide $[Ni_xM_yA_Z(OH)_2]\cdot[(B^{a-})_b\cdot mH_2O]$, and the layered hydroxyl oxide [NixMyAZOOH] including:

S1, performing a ball-milling operation and a sieving operation on a manganese dioxide precursor to obtain a processed manganese dioxide precursor;

S2, formulating a compound salt solution by dissolving a soluble nickel salt, a soluble bismuth salt or a soluble titanium salt, and an A-metal salt in deionized water, formulating an alkaline solution by dissolving an alkaline hydroxide in deionized water, adding the alkaline solution to the compound salt solution at a temperature within a range of 15-50° C., and continuous stirring until pH of a suspension liquid being within a range of 7-11, wherein the suspension liquid is kept at a temperature within a range of 50-95° C. for 5 to 48 hours, after being cooled to room temperature, the suspension liquid is filtered, washed, and dried to obtain a powder, the powder is transferred to a solution prepared from one or more of alkaline hydroxide, phosphate, tungstate, molybdate, chlorinated salt, fluorinated salt, carbonate, metaborate, and borate, processing the solution including the powder under an inert atmosphere or in air at a temperature within a range of 25-200° C. for 1 to 24 hours, and the partially oxidized layered hydroxide $[Ni_xM_yA_Z(OH)_2]\cdot[(B^{a-})_b\cdot mH_2O]$ or a fully oxidized layered hydroxyl oxide $[Ni_xM_yA_ZOOH]$ is obtained by oxidizing the layered hydroxide by chemical oxidation or electrolytic oxidation;

S3, homogeneously dispersing the processed manganese dioxide precursor obtained from S1, the conductive material, and one of the layered hydroxide $[Ni_xM_yA_Z(OH)_2]\cdot[(B^{a-})_b\cdot mH_2O]$, the partially oxidized layered hydroxide $[Ni_xM_yA_Z(OH)_2]\cdot[(B^{a-})_b\cdot mH_2O]$, and the fully oxidized layered hydroxy oxide $[Ni_xM_yA_ZOOH]$ obtained step S2 into water or an organic solvent for reacting at a temperature within a range of 15-90° C. in an atmospheric pressure vessel to obtain a product, and obtaining the composite positive electrode material by drying the product.

7. The method for preparing the positive electrode material of the low-cost alkaline secondary battery of claim 4, wherein the soluble nickel salt is one or more of nickel nitrate, nickel sulfate, nickel acetate, and nickel chloride; the soluble bismuth salt is bismuth nitrate; the soluble titanium salt is titanium sulfate; the A-metal salt is one or more of cerium nitrate, cerium chloride, aluminum nitrate, aluminum chloride, aluminum sulfate, zinc nitrate, zinc sulfate, zinc chloride, calcium acetate, calcium chloride, magnesium acetate, magnesium chloride, cobalt nitrate, cobalt chloride, cobalt sulfate, yttrium nitrate, yttrium sulfate, yttrium chloride, gallium nitrate, antimony sulfate, antimony chloride, ytterbium nitrate, ytterbium chloride, copper chloride, copper sulfate, copper nitrate; the phosphate is one or more of potassium phosphate, sodium hydrogen phosphate, and sodium phosphate; the tungstate is one or more of potassium tungstate, sodium tungstate, and lithium tungstate; the molybdate is one or more of potassium molybdate and sodium molybdate; the chlorinated salt is one or more of potassium chloride and sodium chloride; the fluorinated salt is one or more of potassium fluoride and sodium fluoride; the carbonate is one or more of potassium carbonate and sodium carbonate; the metaborate is one or more of potassium metaborate, sodium metaborate, and lithium metaborate; the borate is one or more of potassium metaborate, sodium metaborate, and lithium metaborate; and the alkaline hydroxide is one or more of sodium hydroxide, potassium hydroxide, and lithium hydroxide.

8. A positive electrode plate for an alkaline secondary battery, wherein the positive electrode plate for the alkaline secondary battery is made from the positive electrode material of the low-cost alkaline secondary battery of claim 1.

9. The positive electrode plate for the alkaline secondary battery of claim 8, wherein the low-cost alkaline secondary battery positive electrode material is supplemented with an additive having a mass fraction within a range of 0.5%-10%, and the additive is one or two of chromium oxide, chromium hydroxide, strontium oxide, strontium hydroxide, ytterbium oxide, and antimony doped tin oxide.

10. An alkaline secondary battery, comprising a battery housing, an electrode plate set sealed in the battery housing, and an electrolyte, wherein the electrode plate set includes a positive electrode plate of claim 8, a negative electrode plate, and a diaphragm, the electrolyte is an alkaline solution of potassium hydroxide, and the electrolyte is added with sodium hexafluoroantimonate with a mass fraction within a range of 0.1%-2%.

11. The positive electrode material of the low-cost alkaline secondary battery of claim 1, wherein the three-dimensional structure includes a multi-stage pore structure, a cladding structure, or a hybrid structure of the multi-stage pore structure and the cladding structure, or a customized three-dimensional structure.

12. The method for preparing the positive electrode material of the low-cost alkaline secondary battery of claim 4, wherein the processing of the manganese dioxide precursor further includes ultrasonic grinding.

13. The method for preparing the positive electrode material of the low-cost alkaline secondary battery of claim 4, wherein the inert atmosphere includes nitrogen or helium.

14. The method for preparing the positive electrode material of the low-cost alkaline secondary battery of claim 4, wherein the processing of the mixture further includes ultrasonic grinding.

\* \* \* \* \*